United States Patent
Dlugosch

(10) Patent No.: US 11,604,687 B2
(45) Date of Patent: *Mar. 14, 2023

(54) PROGRAMMABLE DEVICE, HIERARCHICAL PARALLEL MACHINES, AND METHODS FOR PROVIDING STATE INFORMATION

(71) Applicant: Micron Technology, Inc., Boise, ID (US)

(72) Inventor: Paul Dlugosch, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 45 days.

This patent is subject to a terminal disclaimer.

(21) Appl. No.: 17/308,765

(22) Filed: May 5, 2021

(65) Prior Publication Data

US 2021/0255911 A1 Aug. 19, 2021

Related U.S. Application Data

(60) Continuation of application No. 16/197,099, filed on Nov. 20, 2018, now Pat. No. 11,003,515, which is a
(Continued)

(51) Int. Cl.
*G06F 15/173* (2006.01)
*G06F 9/54* (2006.01)
(Continued)

(52) U.S. Cl.
CPC .......... *G06F 9/544* (2013.01); *G06F 11/3024* (2013.01); *G06F 11/3409* (2013.01);
(Continued)

(58) Field of Classification Search
CPC ... G06F 9/44; G06F 15/17362; G05B 19/045; H03K 3/037
See application file for complete search history.

(56) References Cited

U.S. PATENT DOCUMENTS 4,984,192 A 1/1991 Flynn
5,414,833 A * 5/1995 Hershey ............... H04L 63/145
713/188
(Continued)

FOREIGN PATENT DOCUMENTS

CN 1549976 11/2004
JP H07-129369 5/1995
(Continued)

OTHER PUBLICATIONS

JP Application No. 2013-514375 Office Action dated Jan. 30, 2017 and translation; 6 Pages.
(Continued)

*Primary Examiner* — Jason Crawford
(74) *Attorney, Agent, or Firm* — Fletcher Yoder, P.C.

(57) ABSTRACT

Programmable devices, hierarchical parallel machines and methods for providing state information are described. In one such programmable device, programmable elements are provided. The programmable elements are configured to implement one or more finite state machines. The programmable elements are configured to receive an N-digit input and provide a M-digit output as a function of the N-digit input. The M-digit output includes state information from less than all of the programmable elements. Other programmable devices, hierarchical parallel machines and methods are also disclosed.

20 Claims, 18 Drawing Sheets

Related U.S. Application Data division of application No. 15/353,473, filed on Nov. 16, 2016, now Pat. No. 10,191,788, which is a division of application No. 14/293,338, filed on Jun. 2, 2014, now Pat. No. 9,519,860, which is a division of application No. 13/037,706, filed on Mar. 1, 2011, now Pat. No. 8,766,666.

(60) Provisional application No. 61/353,551, filed on Jun. 10, 2010.

(51) Int. Cl.
  G06F 15/82 (2006.01)
  G06N 5/02 (2023.01)
  G06F 11/30 (2006.01)
  G06F 11/34 (2006.01)

(52) U.S. Cl.
  CPC .. G06F 15/17312 (2013.01); G06F 15/17362 (2013.01); G06F 15/825 (2013.01); G06N 5/02 (2013.01)

(56) References Cited

U.S. PATENT DOCUMENTS

| | | | | |
|---|---|---|---|---|
| 5,699,505 | A * | 12/1997 | Srinivasan | G06F 11/22 714/10 |
| 6,212,625 | B1 | 4/2001 | Russell | |
| 6,715,024 | B1 * | 3/2004 | Lin | G06F 13/1694 711/149 |
| 7,307,453 | B1 * | 12/2007 | Maitland | G06F 7/00 326/46 |
| 7,353,347 | B2 * | 4/2008 | Ng | G11C 15/00 326/46 |
| 7,683,665 | B1 | 3/2010 | Fritz et al. | |
| 8,436,726 | B2 * | 5/2013 | Raghavan | G06F 8/10 340/3.1 |
| 8,766,666 | B2 * | 7/2014 | Dlugosch | G06F 11/3024 326/46 |
| 9,519,860 | B2 * | 12/2016 | Dlugosch | G06F 11/3024 |
| 10,191,788 | B2 * | 1/2019 | Dlugosch | G06F 11/3024 |
| 11,003,515 | B2 * | 5/2021 | Dlugosch | G06N 5/02 |
| 2002/0023256 | A1 * | 2/2002 | Seawright | G06F 30/30 716/105 |
| 2004/0015825 | A1 * | 1/2004 | Iwamasa | G06F 30/30 714/34 |
| 2005/0035784 | A1 * | 2/2005 | Gould | G06F 9/4498 326/46 |
| 2007/0005355 | A1 * | 1/2007 | Tian | G10L 15/02 704/E15.004 |
| 2007/0282570 | A1 * | 12/2007 | Thompson | G06F 8/34 703/2 |
| 2008/0036493 | A1 * | 2/2008 | Kelem | G06F 9/4881 326/38 |
| 2008/0059621 | A1 * | 3/2008 | Raghavan | G06F 8/20 709/224 |
| 2009/0235226 | A1 * | 9/2009 | Murthy | G06F 8/10 717/104 |
| 2011/0307433 | A1 * | 12/2011 | Dlugosch | G06F 15/17312 706/45 |
| 2011/0307503 | A1 * | 12/2011 | Dlugosch | G06N 20/00 707/758 |
| 2012/0192165 | A1 * | 7/2012 | Xu | G06F 9/4498 717/149 |
| 2014/0279796 | A1 * | 9/2014 | Dlugosch | G06N 5/02 706/46 |
| 2017/0060649 | A1 * | 3/2017 | Dlugosch | G06F 11/3024 |
| 2019/0087243 | A1 * | 3/2019 | Dlugosch | G06F 11/3024 |
| 2021/0255911 | A1 * | 8/2021 | Dlugosch | G06F 15/17362 |

FOREIGN PATENT DOCUMENTS

| | | |
|---|---|---|
| JP | 2000181679 | 6/2000 |
| JP | 2002026721 | 1/2002 |
| JP | 2005018310 | 1/2005 |
| JP | 2005242672 | 9/2005 |
| JP | 2006302132 A | 11/2006 |
| JP | 2007142767 | 6/2007 |
| JP | 2008293226 | 12/2008 |
| TW | 200613964 | 5/2006 |
| WO | 2010018710 A1 | 2/2010 |

OTHER PUBLICATIONS

Japanese Application No. 2013-514375, Office Action and translation, 9 Pages, dated Apr. 12, 2016.
Chinese Office Action for CN Application No. 201180035858.6 dated Dec. 10, 2015 and translation; 24 Pages.
Sklyarov V Ed et al. "Reconfigurable models of finite state machines and their implementation in FPGAs" Aug. 1, 2002, pp. 1043-1064.
Extended European Search Report dated Jun. 17, 2015, 8 pages.
TW Office Action dated Jul. 1, 2015 and translation, 8 pages.
CN Office Action dated Mar. 20, 2015 and translation; 14 pages.

\* cited by examiner

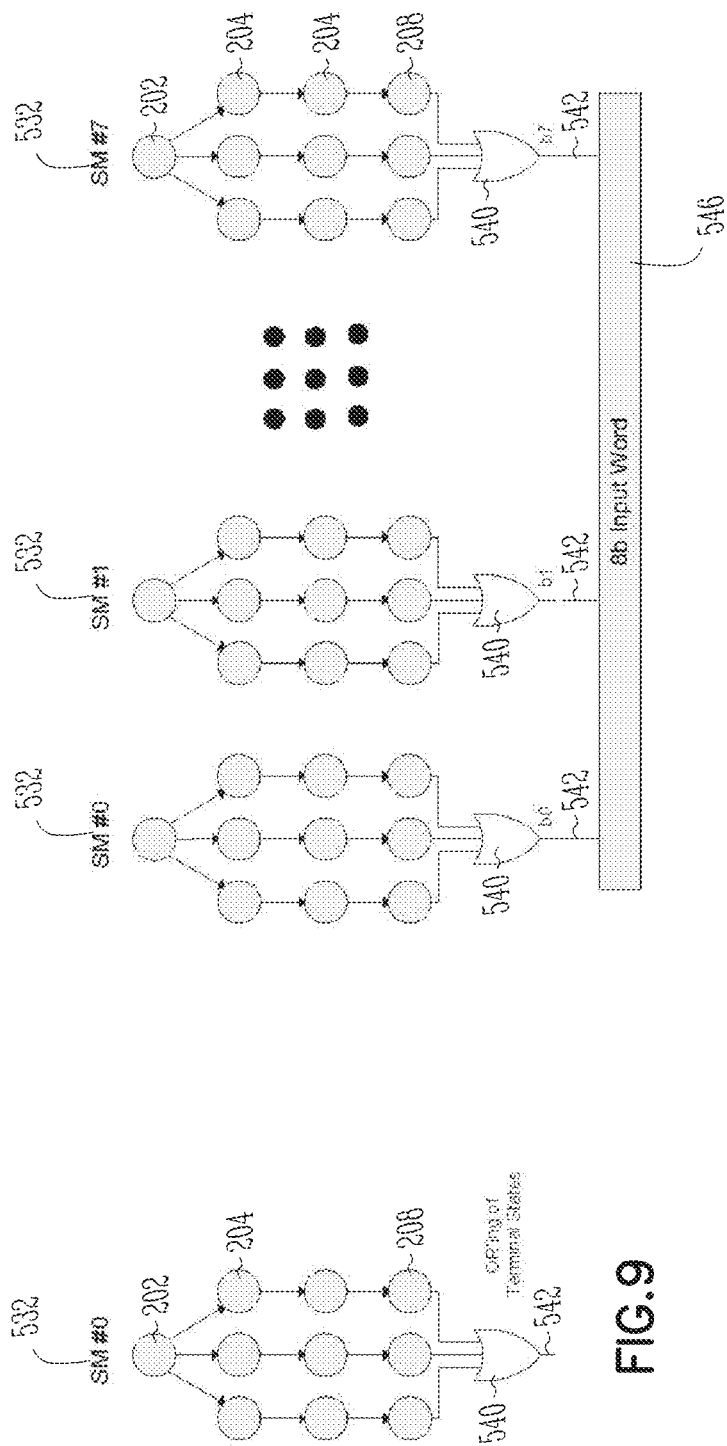

PROGRAMMABLE DEVICE, HIERARCHICAL PARALLEL MACHINES, AND METHODS FOR PROVIDING STATE INFORMATION

CLAIM OF PRIORITY

This application is a continuation of and claims priority of U.S. application Ser. No. 16/197,099, which was filed on Nov. 20, 2018, now U.S. Pat. No. 11,003,515, which issued on May 11, 2021, which is a divisional of and claims priority to U.S. application Ser. No. 15/353,473, which was filed on Nov. 16, 2016, now U.S. Pat. No. 10,191,788 which was issued on Jan. 29, 2019, which is a divisional of and claims priority to U.S. patent application Ser. No. 14/293,338, which was filed on Jun. 2, 2014, now U.S. Pat. No. 9,519,860 which was issued on Dec. 13, 2016, which is a divisional of and claims priority to U.S. application Ser. No. 13/037,706, which was filed on Mar. 1, 2011, now U.S. Pat. No. 8,766,666, which was issued on Jul. 1, 2014, which claims priority to U.S. Provisional Application No. 61/353,551, which was filed on Jun. 10, 2010, which is herein incorporated by reference.

BACKGROUND

One example of a programmable device is a parallel machine. Parallel machines include, for example, finite state machines (FSM) engines and field programmable gate arrays (FPGAs). A FSM is a representation of state, transitions between states and actions. Finite state machines can be expressed in the form of directed flow graphs. They can be used to solve problems in, for example, engineering, pattern recognition, biology and artificial intelligence.

BRIEF DESCRIPTION OF THE DRAWINGS

FIG. 9 illustrates another example of a finite state machine diagram, wherein the final states of the diagrammatically illustrated state machine are aggregated, according to various embodiments of the invention.

FIG. 10 illustrates another example of a group of finite state machine diagrams, wherein the final states of each of the diagrammatically illustrated finite state machines are aggregated, according to various embodiments of the invention.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Figure 1:
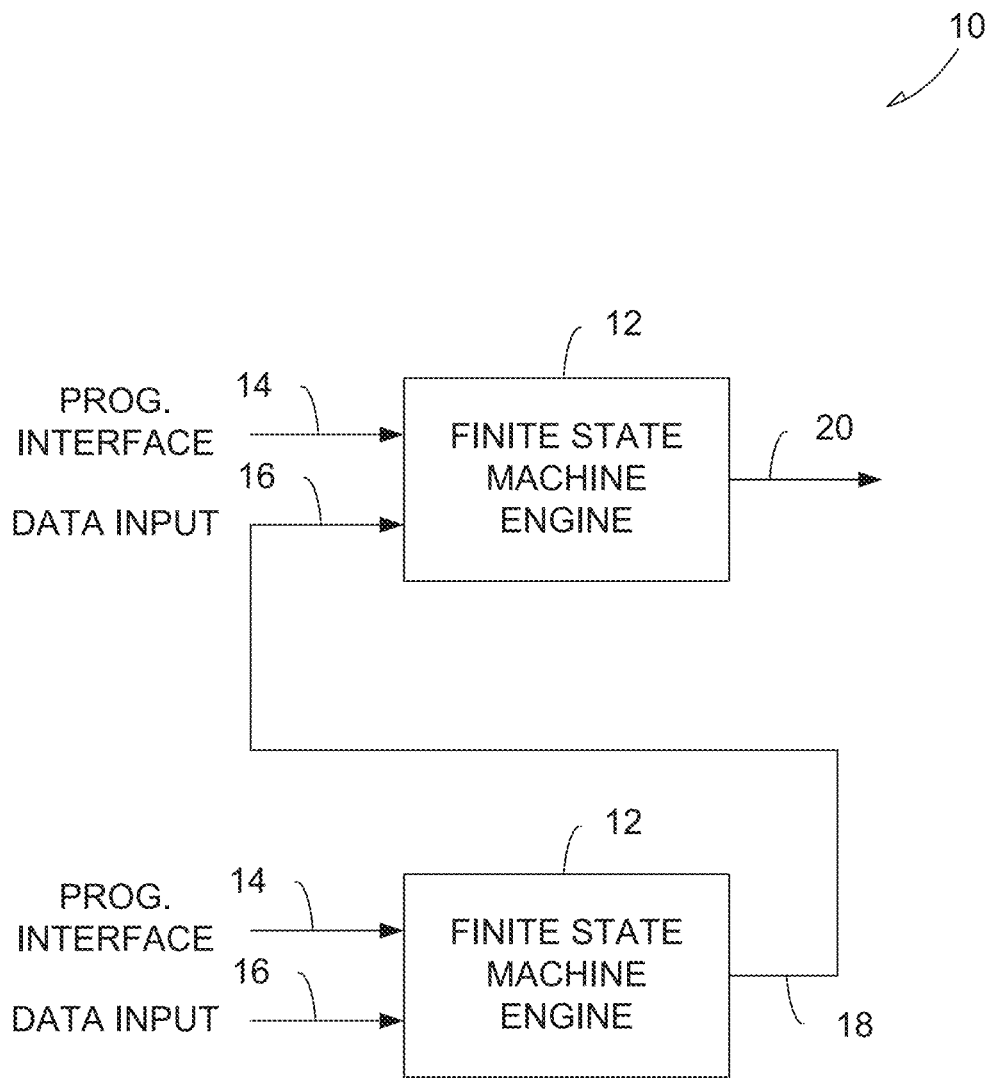
FIG. 1 illustrates an example of a hierarchical parallel machine, according to various embodiments of the invention.

This document describes, among other things, a hierarchical parallel machine, such as a hierarchical finite state machine (HFSM) engine, and related methods. One such hierarchical parallel machine 10 is shown in FIG. 1. Each hierarchical parallel machine 10 includes two or more parallel machines, such as two or more finite state machine (FSM) engines 12. Each finite state machine engine 12 is a device that receives and reacts to data (e.g., a data stream) on an input bus 16 and provides (e.g., generates) an output as a function of the received data.

Each finite state machine engine 12 may be arbitrarily complex. In one embodiment, such as is shown in FIG. 1, finite state machine engines 12 are cascaded, with an output (e.g., state) of at least one of the finite state machine engines 12 provided (e.g., passed) in whole or in part to one or more of the finite state machine engines 12 downstream in the cascade. In an example, the last finite state machine engine in the cascade generates a result, which can be provided on an output bus, such as results bus 20. In one embodiment, each of the finite state machine engines 12 can be programmed via a respective program bus 14, such as by, for example, loading (e.g., storing) a program (e.g., an image) onto a finite state machine engine 12 using the program bus 14.

In some embodiments, it may be important to reduce the time needed to process data with the HPRP 10. The time to process data with the HPRP 10 may be limited, at least in part, by the amount of data (e.g., state information, such as a state vector) passed between finite state machine engines 12. In some such embodiments, the finite state machine engines 12 are connected in a hierarchical configuration, and the interface between finite state machine engines 12 can be designed to approximate real-time operation. Among other things, this document describes such considerations and suggests a general method for physical implementation of a hierarchical set of parallel machines, such as a hierarchical set of FSM engines 12.

Figure 2:
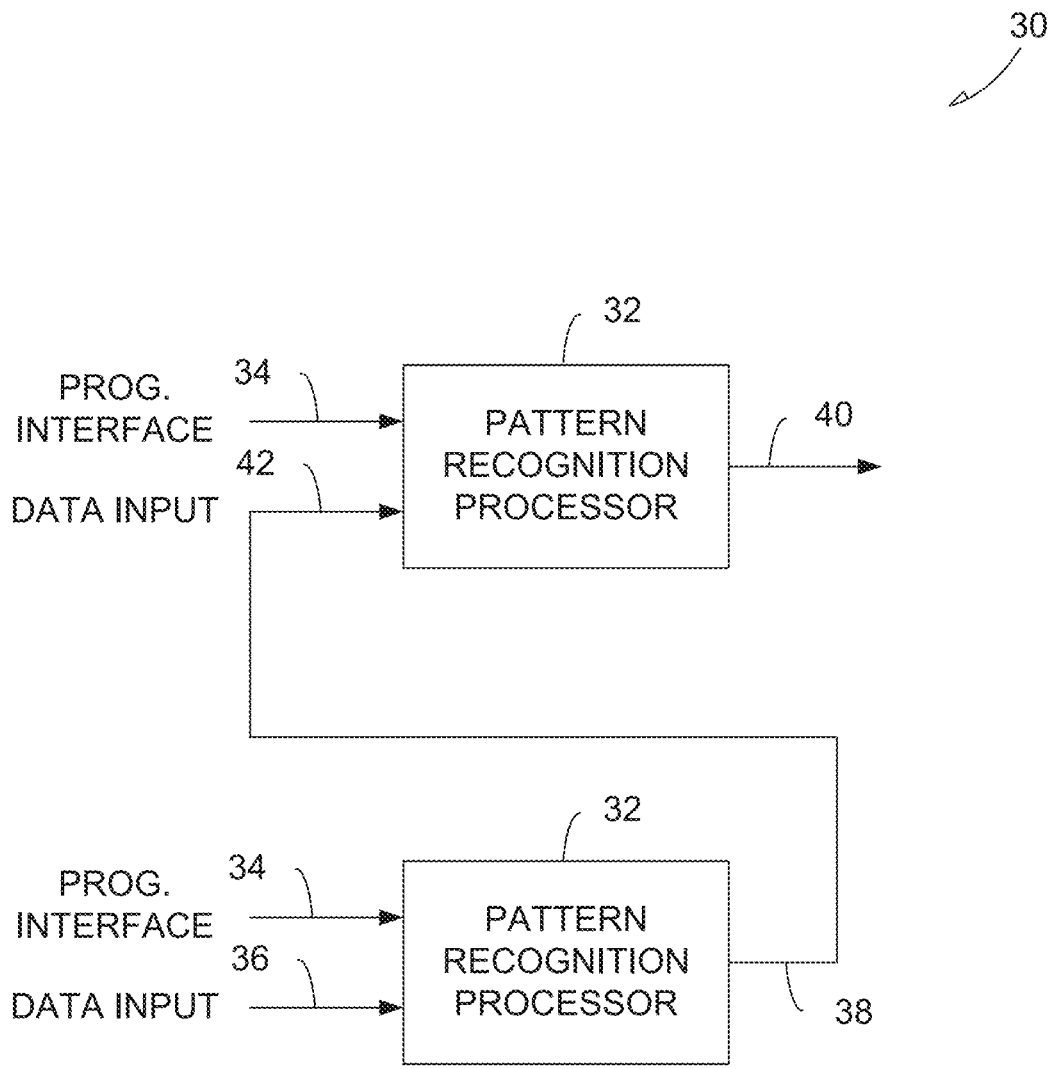
FIG. 2 illustrates an example of a hierarchical parallel machine configured for pattern recognition, according to various embodiments of the invention.

In one example embodiment, a Hierarchical Pattern Recognition Processor (HPRP) 30 is implemented, as shown in FIG. 2. A Pattern Recognition Processor is a device that receives data (e.g., a sequence of symbols) and generates an output that provides some type of notification when a sequence(s) of interest is recognized (e.g., detected). In a simple case, a single stream of input symbols is provided to HPRP 30 on an input bus 36. The HPRP 30 is programmed to detect a specific sequence or specific sequences of input symbols via program bus(ses) 34. Results (detected sequences) are generated, and can be provided on results bus 40. Logical interfaces (Program Interface 34 and Data Input 36) of the HPRP 30 are shown in FIG. 2.

In the embodiment shown, HPRP 30 might include two or more finite state machine engines programmed as Pattern Recognition Processors (PRP) 32. Each PRP 32 is a device that is capable of detecting a sequence(s) of symbols in a respective data stream (such as a data stream on either input bus 36 or input bus 42). For example, each PRP 32 can be capable of matching a respective pattern in a respective data stream. In the illustrated embodiment, the second PRP 32 receives, as its input, an output of the first PRP 32 (as provided on output bus 38) and generates a result on results bus 40. In one embodiment, each of the PRPs 32 can be programmed via a respective program bus 34. An example PRP 32 is described below with reference to FIGS. 15-18 (also referred to as a "content inspection processor"). In certain examples, the HPRP 30 is implemented using a finite state machine (FSM) engine or a field programmable gate array (FPGA), or variations thereof, or another implementation of a parallel machine.

The two level (e.g., stage) hierarchy of hierarchical parallel machines 10 and 30 allows two independent programs to operate based on the same data stream. The two level hierarchy can be similar to visual recognition in the human brain that is modeled as different regions. Under this model, the regions are effectively different pattern recognition processors, each performing a similar computational function (detecting a sequence of symbols in a data stream) but using different programs (e.g., signatures). By connecting multiple parallel machines together, deeper knowledge about the data stream may be obtained.

A first level of the hierarchy (such as one implemented by the first FSM engine 12 or first PRP 32) can perform processing directly on a raw data stream, for example. That is, the first FSM 12 or PRP 32 can generate an output data stream (e.g., an indication of a match or matches in the raw data stream) as a function of the raw data stream on input bus 16 or input bus 36, respectively. As shown in FIG. 1, a second level (such as one implemented by the second FSM engine 12 or second PRP 32) processes an output data stream from the first level. For example, the second FSM engine 12 receives an output data stream from the first FSM engine 12 (provided on output bus 18) and the second FSM engine 12 processes an output data stream of the first FSM engine 12. Accordingly, the second FSM engine 12 does not receive the raw data stream as an input, but rather receives an output data stream generated by the first FSM engine 12. The second FSM engine 12 can be programmed with a first image to detect a sequence(s) in the output data stream generated by the first FSM engine 12. The second FSM engine 12 may be coupled to a separate programming interface (e.g., by a program bus 14) for receiving a second image.

In an example, HPRP 30 can be programmed to implement a pattern recognition function. For example, a FSM implemented by HPRP 30 can be configured to recognize one or more data sequences (e.g., signatures) in a data stream input to the HPRP 30. When a sequence of interest in the data stream is recognized (e.g., matched) by the first PRP 32, an output data stream indicating that recognition can be provided on output bus 38. In an example, the pattern recognition can be to recognize a string of symbols (e.g., ASCII characters) to, for example, identify malware or other information in network data.

This output data stream (e.g., an output word, detection state, etc.) can be fed from the output bus 38 of a first PRP 32 to an input bus 42 of another PRP 32 as shown in FIG. 2. This connection of two PRPs 32 in series provides a means to provide information regarding past events in a compressed word from a first PRP 32 to a second PRP 32. This provision of information can effectively be a summary of complex events (e.g., data stream sequences) that were recognized by the first PRP 32.

As noted above, in some embodiments it may be important to reduce the time needed to pass output between levels of PRPs. In some such embodiments, the interface between PRPs 32 can be designed to support real-time operation of each level of HPRP 30. This document describes such considerations and suggests a general method for physical implementation of a HPRP 30, for example.

This document describes, among other things, methods and apparatus for processing data using a hierarchical structure. The hierarchical structure can comprise a plurality of levels (e.g., layers), where each level processes (e.g., performs an analysis on) data and provides an output (e.g., based on the analysis). The output from lower levels in the hierarchical structure can be provided as inputs to higher levels. In this manner, lower levels can perform more basic/fundamental analysis, while a higher level can perform more complex analysis using the outputs from one or more lower levels. In an example, the hierarchical structure performs pattern recognition.

In an example, the hierarchical structure is implemented with a plurality of finite state machine engines coupled together in a cascading manner. For example, a first and second finite state machine engine can be coupled in series such that the second finite state machine engine receives, as an input, an output from the first finite state machine engine. Any number of finite state machine engines can be coupled together in this hierarchical structure.

In addition to processing data using a hierarchical structure, this document also describes methods and apparatuses for using output from one finite state machine engine to modify the processing performed by another finite state machine engine. Using the finite state machine engine example described above, the second finite state machine engine implementing a higher level of processing can provide feedback information to the first finite state machine engine implementing a lower level of processing. The feedback information can be used by the first finite state machine engine to modify (e.g., update) the processing in a manner similar to learning in a biological brain.

Figure 3:
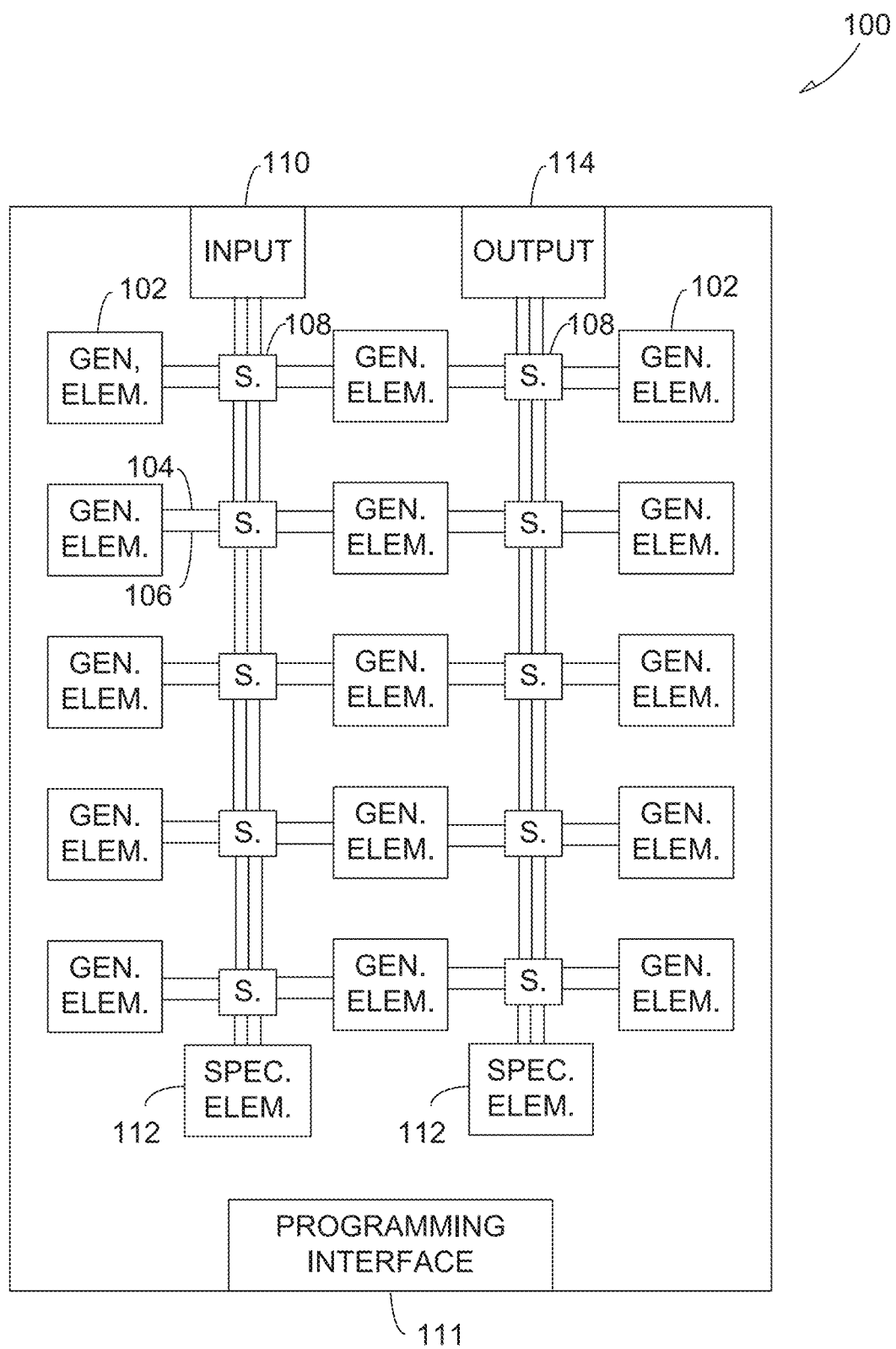
FIG. 3 illustrates an example of a parallel machine, according to various embodiments of the invention.

FIG. 3 illustrates an example parallel machine 100 that can be used to implement a finite state machine engine or a pattern recognition processor. The parallel machine 100 can receive input data and provide an output based on the input data. The parallel machine 100 can include a data input port 110 for receiving input data and an output port 114 for providing an output to another device. The data input port 110 provides an interface for data to be input to the parallel machine 100.

The parallel machine 100 includes a plurality of programmable elements including general purpose elements 102 and special purpose elements 112. A general purpose element 102 can include one or more inputs 104 and one or more outputs 106. A general purpose element 102 can be programmed into one of a plurality of states. The state of the general purpose element 102 determines what output(s) the general purpose elements 102 will provide based on a given input(s). That is, the state of the general purpose element 102 determines how the programmable element will react (e.g., respond) to a given input. Data input to the data input port 110 can be provided to the plurality of general purpose elements 102 to cause the general purpose elements 102 to take action thereon. Examples of a general purpose element 102 can include, for example, a state machine element (SME), as discussed in detail below, a counter, and/or a configurable logic block, among other programmable elements. In an example, a SME can be programmed (e.g., set) to provide a certain output (e.g., a high or "1" signal) when a given input is received at the data input port 110. When an input other than the given input is received at the data input port 110, the SME can provide a different output (e.g., a low or "0" signal). In an example, a configurable logic block can be set to perform a Boolean logic function (e.g., AND, OR, NOR, ext.) based on input received at the data input port 110. An example of a counter is discussed later herein. A special purpose element 112 can include memory (e.g., RAM), logic gates, counters, look-up tables, field programmable gate arrays (FPGAs), and other hardware elements. A special purpose element 112 can interact with the general purpose elements 102 and performing special purpose functions.

The parallel machine 100 can also include a programming interface 111 for loading a program (e.g., an image) onto the parallel machine 100. The image can program (e.g., set) the state of the general purpose elements 102. That is, the image can configure the general purpose elements 102 to react in a certain way to a given input. For example, a general purpose element 102 can be set to output a high signal when the character 'a' is received at the data input port 110. In some examples, the parallel machine 100 can use a clock signal for controlling the timing of operation of the general purpose elements 102. In some embodiments, the data received at the data input port 110 can include a fixed set of data received over time or all at once, or a stream of data received over time. The data may be received from, or generated by, any source, such as databases, sensors, networks, etc, coupled to the parallel machine 100.

Figure 15:
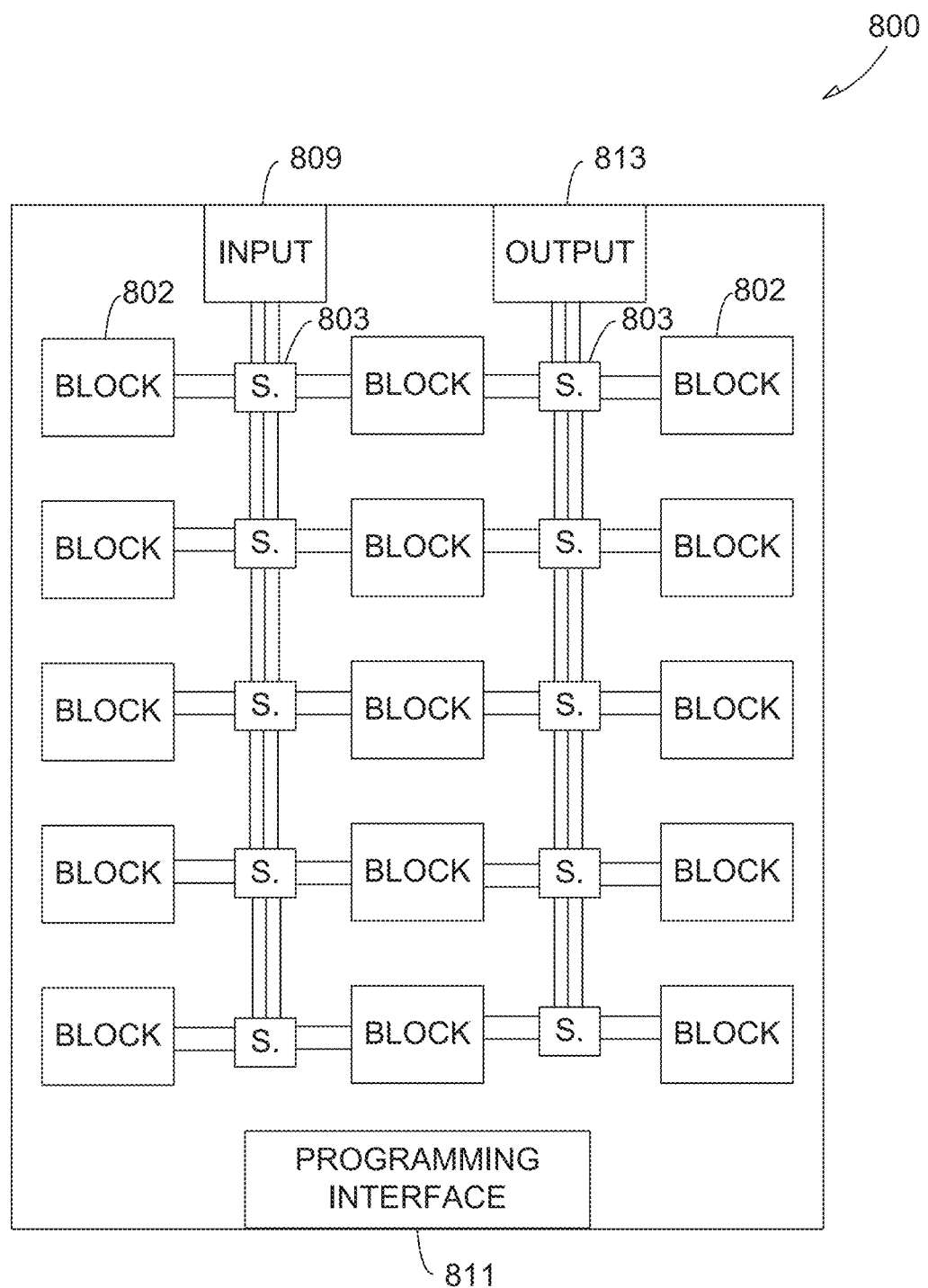
FIG. 15 illustrates a finite state machine engine, according to various embodiments of the invention.

The parallel machine 100 also includes a plurality of programmable switches 108 for selectively coupling together different elements (e.g., general purpose element 102, data input port 110, output port 114, programming interface 111, and special purpose elements 112) of the parallel machine 100. Accordingly, the parallel machine 100 comprises a programmable matrix formed among the elements. In an example, a programmable switch 108 can selectively couple two or more elements to one another such that an input 104 of a general purpose element 102, the data input port 110, a programming interface 111, or special purpose element 112 can be coupled through one or more programmable switches 108 to an output 106 of a general purpose element 102, the output port 114, a programming interface 111, or special purpose element 112. Thus, the routing of signals between the elements can be controlled by setting the programmable switches 108. Although FIG. 3 illustrates a certain number of conductors (e.g., wires) between a given element and a programmable switch 108, it should be understood that in other examples, a different number of conductors can be used. Also, although FIG. 3 illustrates each general purpose element 102 individually coupled to a programmable switch 108, in other examples, multiple general purpose elements 102 can be coupled as a group (e.g., a block 802, as illustrated in FIG. 15) to a programmable switch 108. In an example, the data input port 110, the data output port 114, and/or the programming interface 111 can be implemented as registers such that writing to the registers provides data to or from the respective elements.

In an example, a single parallel machine 100 is implemented on a physical device, however, in other examples two or more parallel machines 100 can be implemented on a single physical device (e.g., physical chip). In an example, each of multiple parallel machines 100 can include a distinct data input port 110, a distinct output port 114, a distinct programming interface 111, and a distinct set of general purpose elements 102. Moreover, each set of general purpose elements 102 can react (e.g., output a high or low signal) to data at their corresponding input data port 110. For example, a first set of general purpose elements 102 corresponding to a first parallel machine 100 can react to the data at a first data input port 110 corresponding to the first parallel machine 100. A second set of general purpose elements 102 corresponding to a second parallel machine 100 can react to a second data input port 110 corresponding to the second parallel machine 100. Accordingly, each parallel machine 100 includes a set of general purpose elements 102, wherein different sets of general purpose elements 102 can react to different input data. Similarly, each parallel machine 100, and each corresponding set of general purpose elements 102 can provide a distinct output. In some examples, an output port 114 from first parallel machine 100 can be coupled to an input port 110 of a second parallel machine 100, such that input data for the second parallel machine 100 can include the output data from the first parallel machine 100.

In an example, an image for loading onto the parallel machine 100 comprises a plurality of bits of information for setting the state of the general purpose elements 102, programming the programmable switches 108, and configuring the special purpose elements 112 within the parallel machine 100. In an example, the image can be loaded onto the parallel machine 100 to program the parallel machine 100 to provide a desired output based on certain inputs. The output port 114 can provide outputs from the parallel machine 100 based on the reaction of the general purpose elements 102 to data received at the input port 110. An output from the output port 114 can include a single bit indicating a match of a given pattern, a word comprising a plurality of bits indicating matches and non-matches to a plurality of patterns, and an output vector corresponding to the state of all or certain general purpose elements 102 and special purpose elements 112.

Example uses for the parallel machine 100 include, pattern-recognition (e.g., speech recognition, image recognition, etc.) signal processing, imaging, computer vision, cryptography, and others. In certain examples, the parallel machine 100 can comprise a finite state machine (FSM) engine, a field programmable gate array (FPGA), and variations thereof. Moreover, the parallel machine 100 may be a component in a larger device such as a computer, pager, cellular phone, personal organizer, portable audio player, network device (e.g., router, firewall, switch, or any combination thereof), control circuit, camera, etc.

Figure 4:
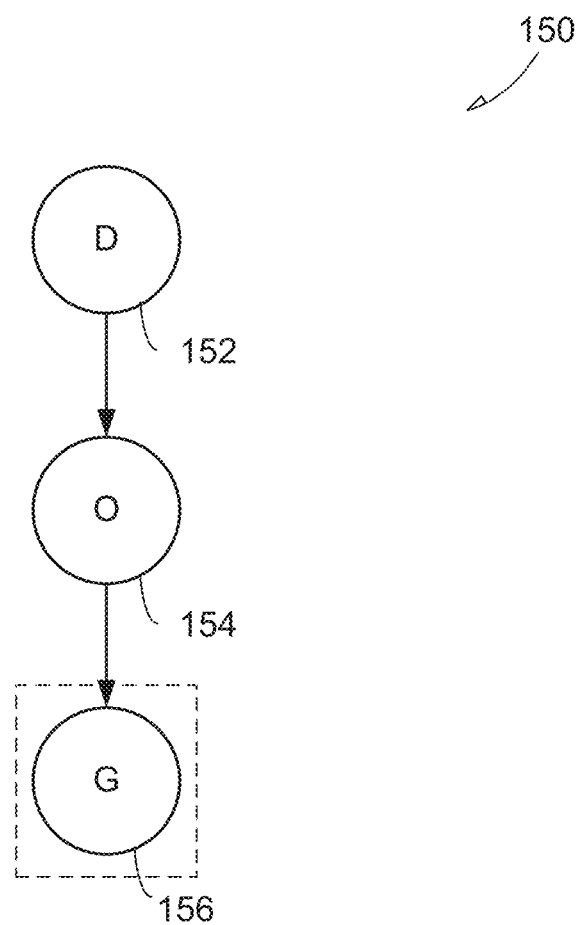
FIG. 4 illustrates an example of a finite state machine diagram, according to various embodiments of the invention.

A parallel machine (e.g., a FSM engine, PRP or the like) can implement a state machine(s). A state machine can be represented as a directed graph. FIG. 4 shows a simple state machine diagram 150 that represents the sequence of characters found in the word 'DOG'. State 152 is the input state for state machine diagram 150. State 154 is an intermediate state. In FIG. 4, the final state 156 (sometimes also called terminal state) is identified by the dotted line border around the 'G' state. In the general case, when the final state is reached, a match condition is indicated through some mechanism. This match condition may be represented by an explicit signal from a parallel machine 100 (e.g., FSM engine 12, PRP 32), or it may be encoded as a binary word and stored in a memory register.

There is no theoretical limit to the size of a state machine. In the general case, a PRP or FSM engine might implement a separate state machine for each specific sequence of symbols that can be detected by the PRP or FSM engine. One can, if desired, perform optimizations on the state machines in order to eliminate redundancies (common paths), such as to combine state machines into a larger implementation or to minimize the size of a particular state machine implementation. Such optimizations can reduce the aggregate size of the state machine implementation(s), and thus, for example, a state machine engine implementing the state machine(s). Once this optimization is complete, a single large state machine may be implemented.

Figure 5:
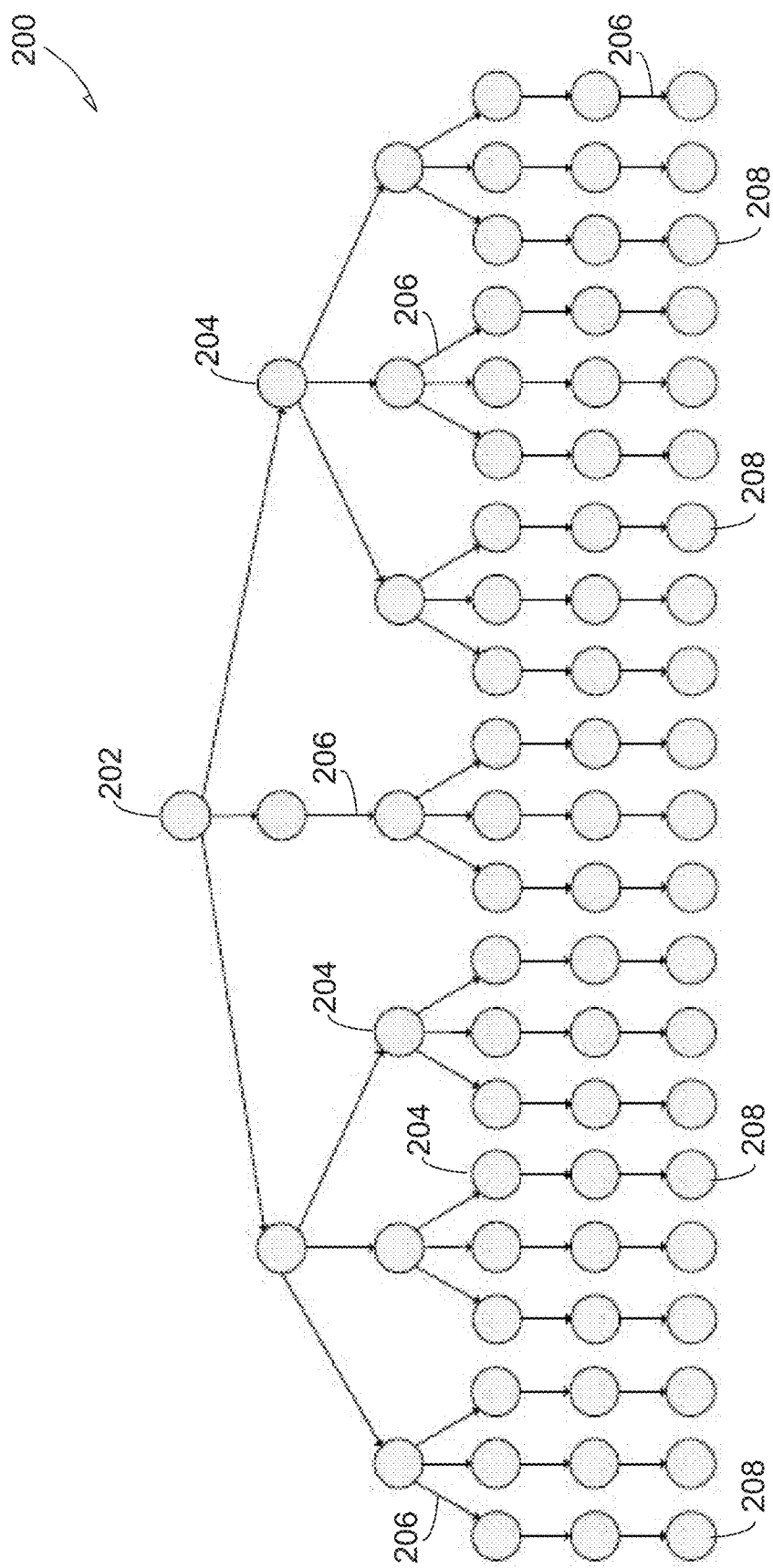
FIG. 5 illustrates another example of a finite state machine diagram, according to various embodiments of the invention.

FIG. 5 shows a larger state machine diagram 200. In the general case, a state machine implementation may have complex connections both forward and backwards. In the example shown in FIG. 5, one input state 202 feeds two intermediate states 204. In such state machines, there may be many final states 208 and many other intermediate states 204.

Each state in a state machine has an instantaneous status that indicates whether the state is active. Only active states can react to an input symbol. In one embodiment, when an input symbol is received on input bus 36, each active state in the state machine will analyze that symbol to determine if an activation signal should be generated. This activation signal will be used to activate the next state in the sequence. For example, a first state 204 that specifies the character 'b' will activate a second state 204, connected to the first state 204 by a transition 206, on the input character 'b' when the first node 204 is active and the character 'b' is received as input data.

In the diagram 200, the input state 202 can be initially activated and can activate a downstream state 204 when the input data matches a transition 206 from the input node 202. States 204, 208 throughout the diagram 200 can be activated in this manner as the input data is received. An activated final state 208 corresponds to a match of a sequence of interest by the input data. Accordingly, activation of a final state 208 indicates that a sequence of interest has been received at the input data. In the context of a finite state machine engine 100 implementing a pattern recognition function, activating a final state 208 can indicate that a specific pattern of interest has been detected on the input data.

In an example, each intermediate state 204 and final state 208 can correspond to a general purpose element 102 in the finite state machine engine 100. Each transition 206 can correspond to connections between the general purpose elements 102. Thus, an intermediate state 204 that transitions to (e.g., has a transition 206 connecting to) another intermediate state 204 or a final state 208 corresponds to a general purpose element 102 that can be coupled to another general purpose element 102. In some special cases, the start state 202 may not necessarily have a corresponding general purpose element 102.

When a finite state machine engine 100 is programmed to implement a FSM, each of the general purpose elements 102 can be in either an active or inactive state. An inactive general purpose element 102 does not react to the data stream at the input interface 110. An active general purpose element 102 can react to the data stream at the input interface 110, and can activate a downstream general purpose element 102 when the input data stream matches the setting of the general purpose element 102. When a general purpose element 102 corresponds to a final state 208, the general purpose element 102 can be coupled to the output port 114 to provide an indication of a match to an external device, which in some cases could be another finite state machine engine 100.

An image loaded onto the finite state machine engine 100 via the programming interface 111 can configure the general purpose elements 102 and the connections between the general purpose elements 102 such that a desired FSM is implemented through the activation of downstream states based on responses to the data stream at the input interface 110. In an example, a general purpose element 102 remains active for a single data cycle (e.g., a single character, a set of characters, a single clock cycle) and then switches to inactive unless re-activated by an upstream general purpose element 102.

A final state 208 can be considered to store a compressed history of past events. For example, the one or more sequences of input data required to activate a final state 208 can be represented by the activation of that final state 208. In an example, the output provided by a final state 208 is binary, that is, the output indicates whether a corresponding sequence of interest has been matched or not. The ratio of final states 208 to intermediate states 204 in a FSM may be quite small. In other words, although there may be a high complexity in the FSM, the output of the FSM may be small by comparison.

Whether a FSM engine implements a single combined (optimized) state machine, or implements many independent state machines, the concept of a state vector exists. A state vector is a one dimensional vector that has a one-to-one correspondence between the individual states in the implemented state machine(s) and the individual digit (e.g., bit) positions within the vector. That is to say that each state in the state machine(s) is related to a digit in the state vector. In the case of FIG. 4, the state vector is 3 bits wide (with one bit indicating the state of each of states 152, 154 and 156). In the case of FIG. 5, the state vector is 74 bits wide. State machines can be arbitrarily complex and therefore, in theory, there is no limitation placed on the overall size of the machine. Consequently, the state vector can be infinitely long.

In order to implement practical state machines in parallel machines, however, some finite limitation usually is placed on the size of the state machines. This limit is not strictly defined and can be determined based on the characteristics of the parallel machine used to implement the state machines.

Figure 6:
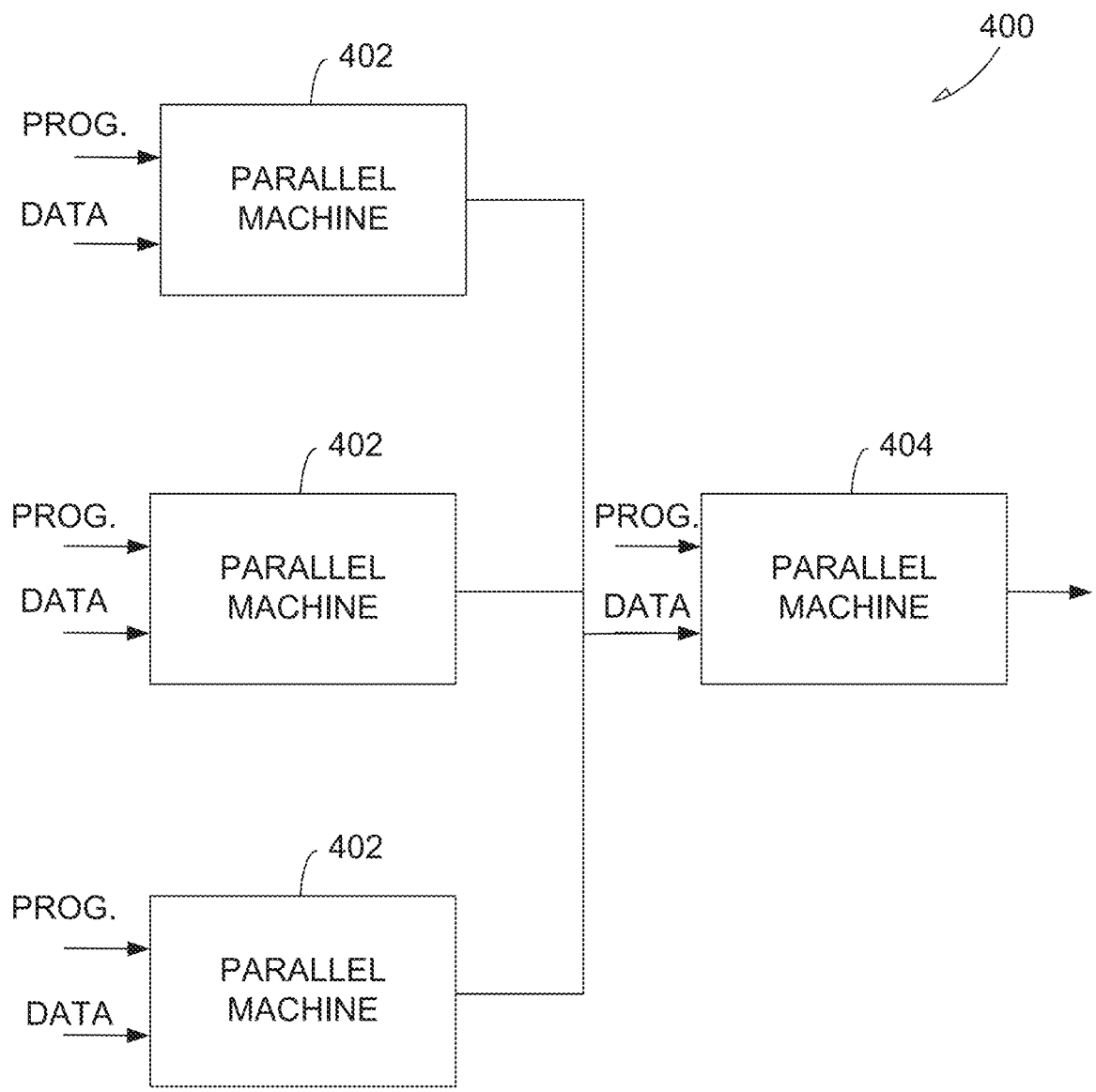
FIG. 6 illustrates another example of a two-level hierarchy implemented with parallel machines, according to various embodiments of the invention.

Another HFSM 400 is shown in FIG. 6. In the HFSM 400 shown in FIG. 6, three finite state machine engines 402 provide information regarding their respective states to one finite state machine engine 404 using all or a portion of all their respective state vector digits. In the example shown, each state machine engine (402, 404) is programmed via its respective programming interface (PROG). In other embodiments, data from each of FSM engines 402 is used to program FSM engine 404. In some such embodiments, FSM engine 404 is designed to adapt to the state information received from FSM engines 402.

Figure 7:
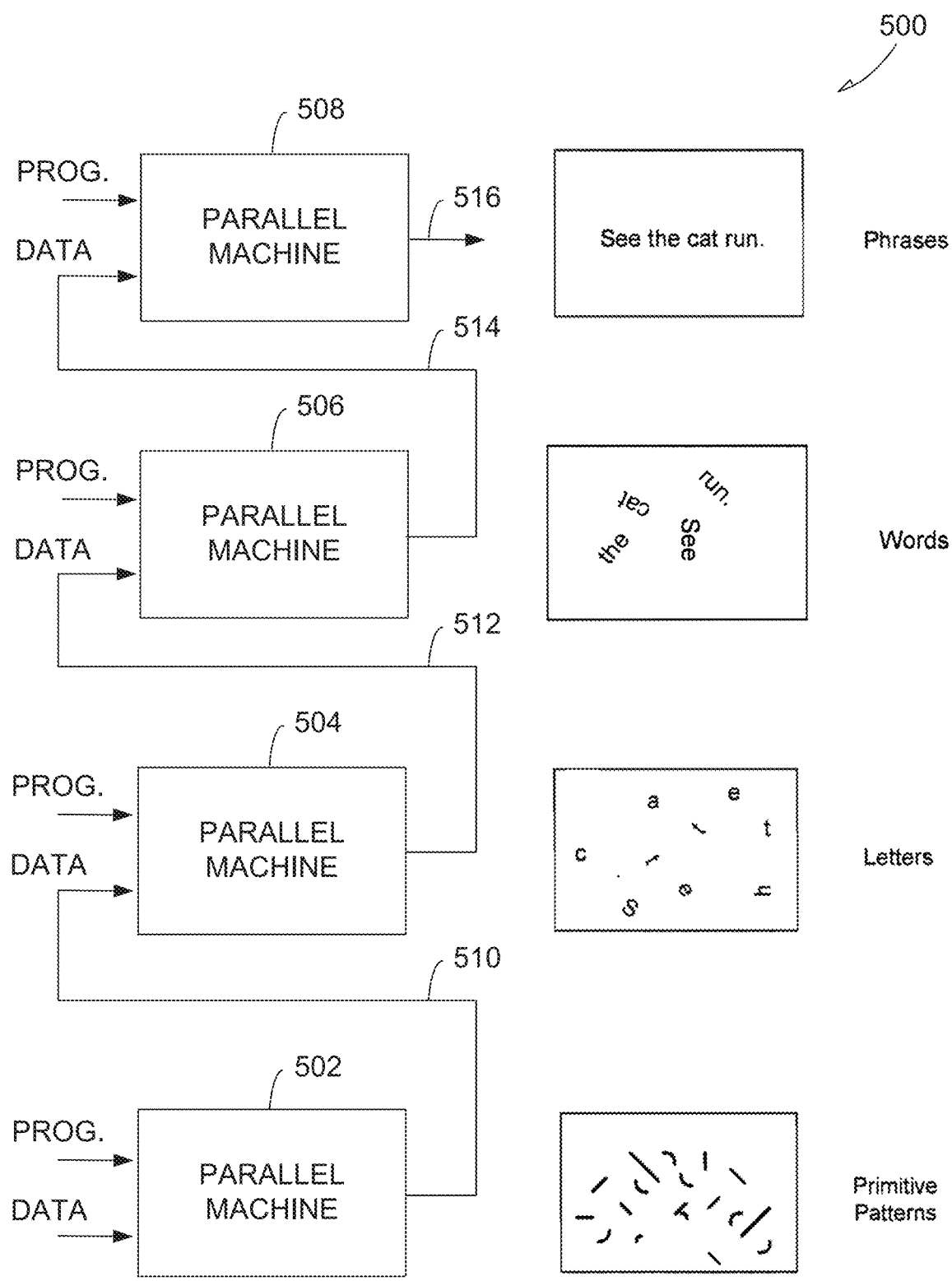
FIG. 7 illustrates an example of a four-level hierarchy implemented with parallel machines, according to various embodiments of the invention.

A more complex HFSM 500 is shown in FIG. 7. In the HFSM 500 of FIG. 7, multiple FSM engines 502, 504, 506, 508 are connected together, with FSM engine 502 providing (e.g., feeding) state information through bus 510 to FSM engine 504, FSM engine 504 feeding state information through bus 512 to FSM engine 506, and FSM engine 506 feeding state information through bus 514 to FSM engine 508. This connecting of multiple FSM levels 502-508 allows each level of the hierarchy to implement different state machines. In some example HFSMs, each level of the hierarchy is sensitive to different types of patterns. In these example HFSMs, as in HFSM 500, this separation of hierarchical levels allows the HFSM to implement low level recognition that is passed through various levels of the hierarchy to achieve higher level recognition. In one example, a result is provided on a results bus 516 of HFSM 500, such as, e.g., identification of a particular pattern (e.g., a phrase). In other examples, the result is a combination of state bits from one or more of FSM engines 502, 504, 506, and 508.

As shown in FIG. 7, one approach for connecting individual FSM engines in a hierarchical manner is to connect the output of one FSM engine to the input of the next higher level FSM engine in the hierarchy. It should be understood that a HFSM 500 could be implemented in which state information from one level is provided (e.g., fed forward or back) to any other level in the hierarchy. For instance, state information from FSM engine 502 might be sent to FSM engine 506, while state information from FSM engine 508 might be fed back to FSM engine 502. In general terms, state information from one or more FSM engines can be provided to one or more (e.g., all) of the other FSM engines in whatever configuration is deemed necessary.

The example shown in FIG. 7 corresponds to a visual identification of written language. As the processing progresses to higher levels of the hierarchy, the accumulated knowledge of the data stream grows correspondingly. In the embodiment shown, the FSM engine at each level (FSM engines 502, 504, 506 and 508) are cascaded to accomplish hierarchical recognition capability. Each successive level of the hierarchy can implement new rules (pattern signatures) that are applied to the output of the previous level. In this way, highly detailed objects can be identified based on the detection of very basic primitive information.

For example, the raw data input stream to level one (e.g., the first FSM engine 502) can comprise pixel information (e.g., whether a given bit is black/white or on/off) for an image. FSM engine 502 can be programmed to recognize (e.g., identify) primitive patterns formed by the bits. In one example, FSM engine 502 is configured to identify when a group of adjacent bits form vertical lines, horizontal lines, arcs, etc. Each of these patterns can be identified by a separate output bit (or signal) from FSM engine 502. For example, when FSM engine 502 recognizes a vertical line of at least 3 bits, a high signal (e.g., logical one) can be sent on a first bit of an output word to FSM engine 504. When FSM engine 502 identifies a horizontal line of at least 3 bits, a high signal can be sent on a second bit of an output word to FSM engine 504.

FSM engine 504 meanwhile can be programmed to identify patterns formed by the output 510 from the FSM engine 502. For example, FSM engine 504 can be programmed to identify patterns formed by combinations of the primitive patterns (lines, arcs, etc.) identified by FSM engine 502. FSM engine 504 can be programmed to identify when a horizontal line and a vertical line cross forming the letter "t", for instance. As mentioned above, the HFSM 500 implemented using FSM engine 504 reacts to the output from FSM engine 502. Thus, the combinations of the primitive patterns are identified by identifying patterns in the output bits from FSM engine 502.

The output 512 from FSM engine 504 is then input into FSM engine 506, which can identify words from combinations of the letters identified by FSM engine 504. The fourth level (FSM engine 508) can then identify phrases formed by the words identified by FSM engine 506. Accordingly, higher levels can be programmed to identify patterns in the lower level outputs. Additionally, lower levels can be programmed to identify components that make up the patterns identified in the higher level (feedback to lower levels).

The visual identification of letters is used as an example. The hierarchical method and system described herein can, however, be applied to other data. For example, hierarchical processing on data corresponding to sounds can identify syllables from combinations of phonemes at level one and words from combinations of syllables at level two. In other examples, the hierarchical processing can be applied to machine data that builds upon itself in a hierarchal manner.

When implementing a HPRP or HFSM, such as HFSM 500, one problem that can be encountered is the asymmetric relationship between input data and output data. This asymmetry is exacerbated when the state machine(s) being implemented becomes sufficiently large. For each input symbol that is processed, the state vector of a FSM engine can change responsive to the input symbol. In one embodiment, each FSM includes, for example, up to 2 to the 16th power (64K) states. If each state has a corresponding digit in the state vector, the state vector would be 64K bits long. It can be difficult to pass vectors of that length between FSM engines. Ways to reduce this asymmetry between the size of the input data and the size of the output data will be described next.

In one embodiment, data is sent between FSM engines on a bus. An N-bit wide bus can pass a 64 Kb state vector in 64 Kb/N cycles. In other embodiments, the state vector is compressed such that only digits in the vector that change in response to an input symbol propagate to the other FSM engines. For instance, each bus cycle might include the location of a digit in the state vector that changed in the previous symbol cycle. In this case, the output can be referred to as a difference vector.

In yet another embodiment, each FSM engine is designed to send only a subset of digits from the state vector to the other FSM engines. In one such embodiment, each FSM engine is programmed such that the only state information passed to the other FSM engines is that of final states. In the general case, the number of final states is smaller than the total number of states. The ratio of final states to total states in a PRP 32, for example, is dependent upon the state machines that are implemented in the PRP. Ratios can be high (1:5) or quite low (1:10,000), for example.

In a practical example where the ratio of final states to total states is 1:10 and the state vector is 64 Kb, this implies that an output vector would be 64 Kb/10 or 6,554 bits. In this example, every input cycle of the PRP (8 bit symbols) would generate a corresponding output vector of 6,554 bits.

For the examples going forward, we will use an example where the ASCII character set is the input (symbol) language. In this case, each input symbol is represented by an 8-bit binary word. In alternative embodiments, other symbols can be used, such as where each input symbol is an N-bit binary word.

For instance, in one embodiment, the output vector sent to the second level PRP 32 in a HPRP 30, such as that depicted in FIG. 2, might represent only the final states of the first level PRP 32. In another example, in a HFSM 500, such as that depicted in FIG. 7, FSM engine 504 can generate an output vector representing its final states and send the output vector to FSM engine 506 on output bus 514. In one such example, output bus 514 is an eight bit wide bus. Using the 8:6,554 ratio cited from the previous example, the number of cycles needed to provide (e.g., transfer) the 6,554 bits of the output vector would be 6,554/8, or 820, cycles. That is, each successive level of the hierarchy would require 820 input cycles to process the output word from the previous level. This effect ripples through the hierarchy linearly, so that each successive state will require 820 input cycles to resolve its input word. In this case, with the given ratios, a six level hierarchy of PRP's would require 4,100 (5×820) input cycles to allow the input symbol to ripple through until a result is produced at the highest level. These numbers only serve as an example. If the final state to total state ratio is increased, the ripple time will increase. Likewise if the number of levels of the hierarchy is increased, the ripple time will increase linearly with each successive level.

Based on the examples used above, a delay of several orders of magnitude (relative to the input cycle) is possible for a HFSM or HPRP to produce a result. Delays of this type may be unacceptable in real-time applications. As noted above, one can reduce the number of cycles needed to transfer the state information by, for instance, increasing the size of the bus. One can also decrease the bus cycle time to reduce the time needed to transfer the state information. Further, as noted above, one can send a difference vector which only identifies the digits of the state vector that changed as a result of the last symbol. Other lossless compression mechanisms can be used as well.

Other methods to reduce this delay are discussed next, such as implementing a 1:1 relationship between input and output.

One way to get a 1:1 relationship between input and output in a HFSM, such as HFSM 500, is to make the input bus 518 and the output bus 510 equal in size (width). The width of output bus 510 can be determined by the HFSM 500 itself. For example, the size of output bus 510 could be determined by the number of final states in the state machine engine 502. Generally speaking, a FSM engine is programmed to recognize many different patterns at once. Each of these patterns may be implemented as an individual state machine. In this way, a FSM engine may implement a set of state machines, all running in parallel.

Figure 8:
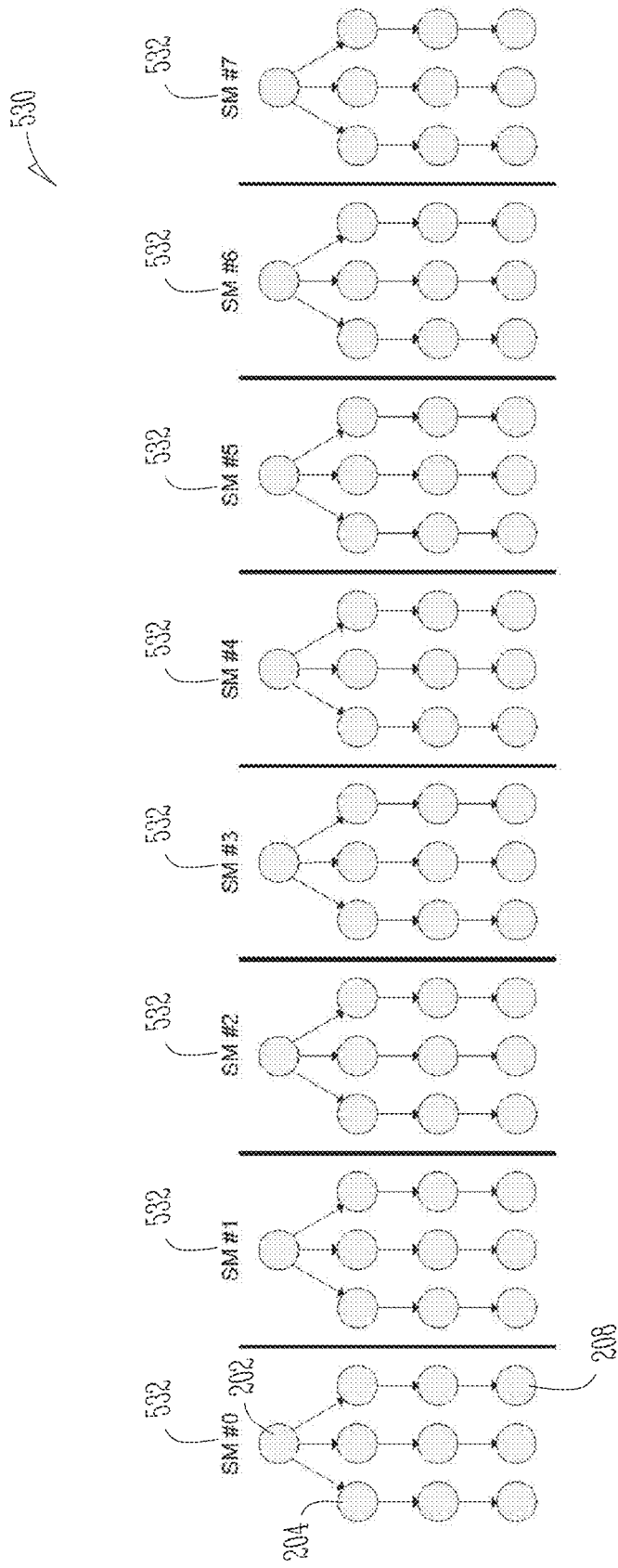
FIG. 8 illustrates an example of a group of finite state machine diagrams, according to various embodiments of the invention.

FIG. 8 diagrammatically shows an example of a group 530 of state machines 532 all running in parallel within a single FSM engine. In FIG. 8, eight state machines 532 are shown. In practice a FSM engine may implement thousands of individual state machines.

Step 1: Aggregation of State Machine Outputs (Final States)

As shown in FIG. 9, each individual state machine 532 may have one or more final states 208. Although there may be several final states 208, any one of the final states of a particular state machine 532 has the same, or a related meaning. Another way of saying this is that a state machine 532 is considered to have a match if ANY of the final states 208 of the state machine is reached. Effectively, this means that the final states 208 of a single state machine 532 may be aggregated (e.g., OR'd together), such as by using an OR gate 540 to couple together the outputs of the programmable elements corresponding to the finals states, to provide a single output 542 as shown in FIG. 9. In the example shown in FIG. 9, state machine 532 ORs together three final states 208. As can be understood, other logic could be used to aggregate the final states 208.

In one example, once the final states 208 of each state machine 532 have been aggregated (e.g., OR'd), the results are grouped (e.g., collected) in logical groups of N state machines 532, where N is equal to the number of digits in the respective input symbol language. In an example where the input symbol language of a first level comprises 8-bit input words, 8 individual state machine outputs 542 could be aggregated to provide one of the input symbols 546 provided to the next level of the hierarchy. In FIG. 7, for example, only the first level of the hierarchy receives input symbols that correlate to a standard language (ASCII or other). In that example then, FSM engine 502 might generate an eight bit output vector that is provided to FSM engine 504 on an output bus 510. Subsequent levels of the hierarchy receive input symbols that have meaning that is determined by the previous level.

Once state machines have been grouped, such as in sets of 8, the first level of normalizing the input and output vectors has been completed. Using the numbers from the example used in this disclosure, 820 final states could be represented in 103 8-bit words. Each of these 8-bit words encodes the status of the final states for 8 individual state machines 532. Keep in mind that the total number of final states encoded in this 8 bit output vector may be much greater than 8. This is because the OR'ing function performed on final states 208 in the same state machine 532 may OR more than eight states together.

In one embodiment, each FSM engine includes an N bit-wide input port and an N bit-wide output port. In one embodiment, state information from each level (e.g., in the form of an output vector, such as all or a portion of a state vector, or a difference vector) is distributed through an N bit bus to the next FSM engine. For instance, FSM engine 502 distributes state information to FSM engine 504 using the N-bit output bus 510. In one embodiment, the same N-bit output vector is provided (e.g., distributed) to each state machine in FSM engine 504. In another embodiment, programmable elements in FSM engine 504 are grouped into groups (e.g., blocks) and the output port of FSM engine 502 writes a sequence of N-bit words to FSM engine 504 and the sequence of words is distributed to the blocks of state machine elements in FSM engine 504 in a pre-defined manner (such as sequentially). Such an approach allows the distribution of additional state information to FSM engine 504, but requires additional bus cycles to transfer complete state information.

In one embodiment, state information for one group of programmable elements is sent to a group of programmable elements in another FSM engine by sending address information including an indication of the FSM engine and the address of the group within the FSM engine. That information could be distributed, for example, on bus 510 in FIG. 7.

Step 2: Expansion of the Number of Input Busses on the PRP

One implementation of a FSM 12 or a PRP 32 has a single stream input that broadcasts an input symbol to all state machines 532 implemented in the PRP. The definition of FSM 12 and PRP 32 may, however, be extended to implement more than one stream input (16 and 36 respectively). In the example previously cited, the total number of independent stream inputs would equal 103. To completely implement, for example, a HPRP would then require 103 8-bit inputs or an input bus of 820 bits for each PRP 32.

Figure 11:
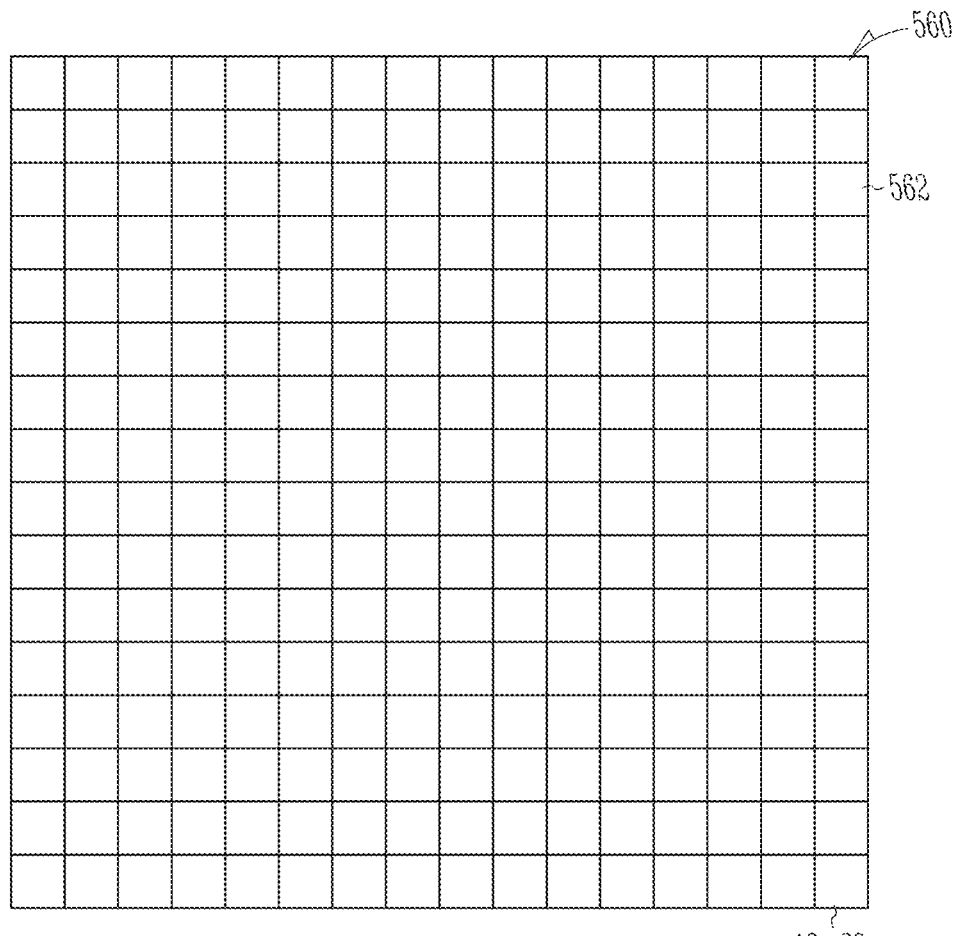
FIG. 11 illustrates an example of an array of programmable elements, according to various embodiments of the invention.

In one embodiment, FSM 12 and PRP 32 are implemented on an array 560 of programmable elements, such as state machine elements (SMEs). In one example, each SME is in a homogenous two-dimensional array 560. This array 560 may be subdivided into individual regions with each region having it's own dedicated stream input (16 and 36, respectively). FIG. 11 shows such a two dimensional array 560 of SME elements. FIG. 11 is subdivided into an array 560 of SME groups 562, wherein each group 562 of SMEs may correspond to a block 802 in finite state machine engine 800, for example. The entire array 560 might include, for example, 16×16 SME groups (256 groups, total), with each group 562 including 128 groups of two SMEs (GOTs) (e.g., where each group 562 includes 16 rows of GOTs, such as rows 806 illustrated in FIG. 16).

In some embodiments, each row of GOTs contains eight GOTs, an additional programmable element(s) (e.g., Boolean logic or a counter) and can provide two outputs to the output bus 18, 38. If all available outputs are used across the FSM 12 and PRP 32, such an array may have, for example, up to 8192 bits to drive to the next level PRP 32.

Figure 12:
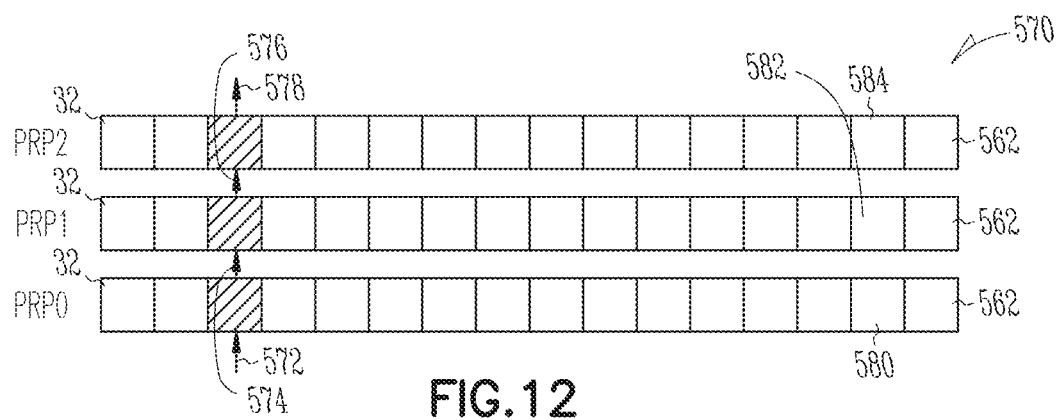
FIG. 12 illustrates an example of a stack of pattern recognition processors, according to various embodiments of the invention.

When a HFSM 500 is constructed such as is shown in FIG. 7, the two dimensional arrays of SME groups 562 in two different semiconductor devices, such as FSM engines 502 and 504, may be connected together. There are various means of connecting two semiconductor devices together. When the I/O count gets sufficiently high, die to die interconnect may be utilized, for example. In one example implementation, as is shown in FIG. 12, each one of the 256 SME groups 562 in a HPRP 570 could have an 8-bit interface (e.g., input bus 36, 42) on the bottom of a die and an 8 bit interface (e.g., output bus 38, 40) on the top of the die. When these interfaces are put in predefined locations, one level of PRP (PRP1) 582 can be stacked directly on top of a lower level PRP (PRP0) 580, with the input and output interfaces naturally aligned and connected together using interconnects (e.g., through-silicon vias), such as interconnect 574.

This alignment effectively creates the concept of a SME column (defined by input path 572, output path 578 and interconnects 574 and 576) with each level of the column representing a group of SMEs contained on a same die. Continuing to use the example numbers previously discussed, on each PRP level (580, 582 and 584), an SME group 562 can be driven by up to 8 state machines implemented on the previous level. The 8 state machines from the previous level may be arbitrarily complex up to the limit imposed by the SME group 562. FIG. 12 shows an example of a three-level HPRP (edge view) with one of the SME columns highlighted. In each level a grouping of SMEs provides state information from that level (e.g., an encoded 8 bit word) to the next higher level.

Overall, when configured in this way, a HPRP can provide substantially instantaneous results with the delay of only one input clock cycle for each level of the PRP hierarchy. The problem posed by the asymmetry of the input and output words is resolved and the entire hierarchy may operate in sync with the stream input 572.

In certain embodiments, state information from one FSM engine 12 is sent to more than one other FSM engine 12. Such an embodiment is shown in FIG. 6. Describing such an embodiment with reference to the HPRP 570 illustrated in FIG. 12, for instance, state information from PRP 580 could be sent to PRP 584. In one such embodiment, interconnect 576 and 574 form a bus that transmits state information to any of the blocks in the column. For example, interconnects 574 and 576 may comprise one or more through via interconnects, and can be provided in each column for passing state information to nonadjacent PRPs. In one such embodiment, each PRP in the stack is connected to and receives information from the through vias. In another embodiment, inputs of PRP are selectively connected to through vias during the manufacturing process as needed.

In other embodiments, state information from one group of SMEs is distributed to adjacent blocks in the same PRP 32, and through those blocks to other PRPs 32 (e.g., in the same block column).

Figure 13:
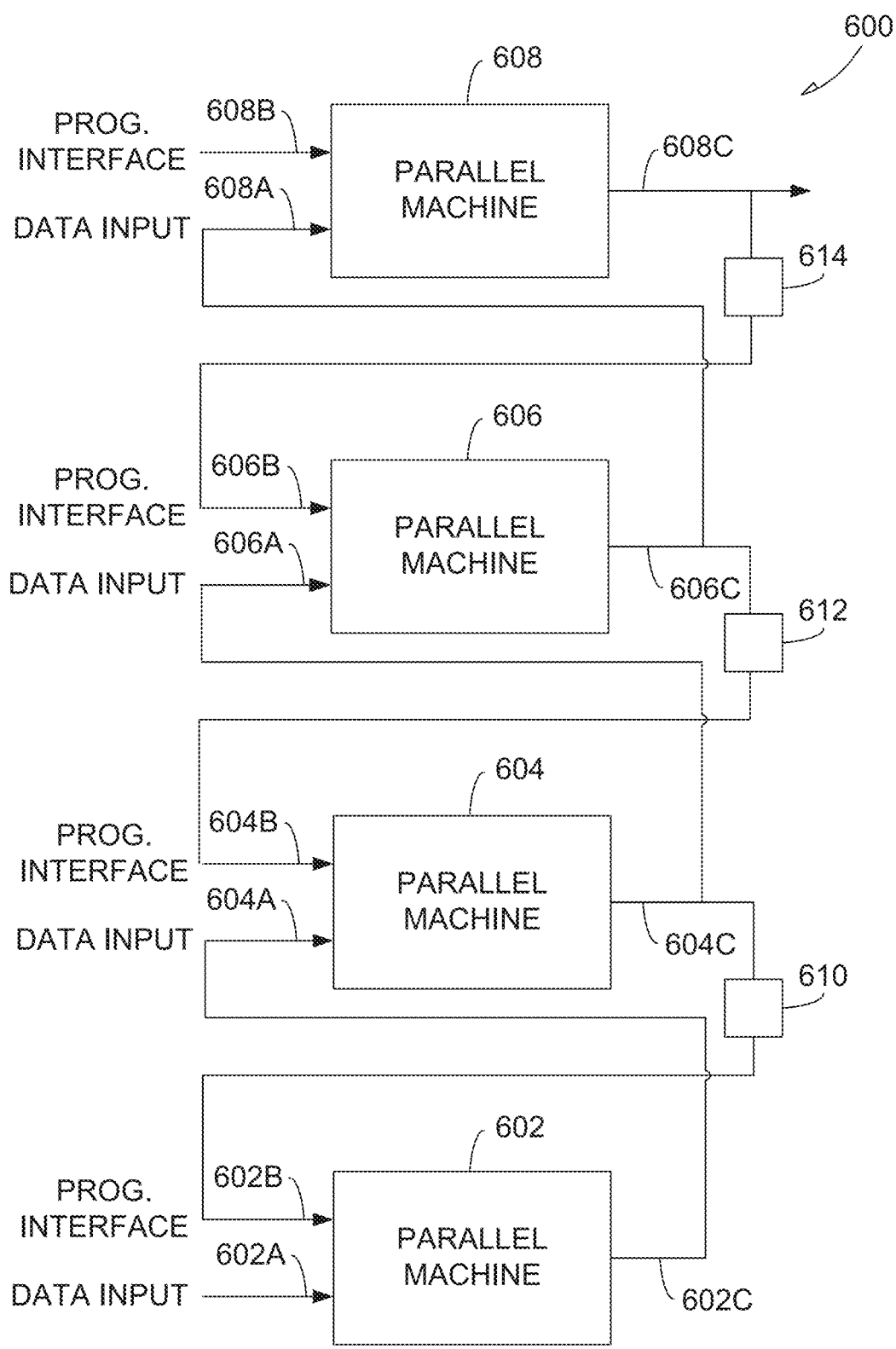
FIG. 13 illustrates an example of a four-level hierarchy having feedback implemented with parallel machines, according to various embodiments of the invention.

In one embodiment, state information from one or more PRPs 32, or information derived from that state information, is used to reprogram other PRPs 32 in the hierarchy. FIG. 13 illustrates an example of a four level hierarchy that uses feedback to reprogram portions of the hierarchy. In general a given PRP 32 (e.g., the first finite state machine engine 602) can be reprogrammed based on an output from a higher or lower level finite state machine engine or based on its own output. Thus, the first finite state machine engine 602 can change to adapt to changing conditions during run-time. In an example, the feedback can be used for the lower levels to learn (be reprogrammed) based on the higher levels. The feedback, using the finite state machine engine 602 as an example, can be received at the programming interface 602B and can be in the form of a new or updated program for the finite state machine engine 602. In an example, the updated program can reprogram some or all of finite state machine engine 602.

The four-level hierarchy 600 in FIG. 13 is implemented with four finite state machine engines 602, 604, 606, 608 which each have a an input port 602A, 604A, 606A, 608A, a programming interface 602B, 604B, 606C, 608B, and an output port 602C, 604C, 606C, 608C. The first finite state machine engine 602 implements the first level of the hierarchy 600 and provides an output to the second finite state machine engine 604 which implements the second level of the hierarchy 600. The third and fourth finite state machine engines 606, 608 likewise implement the third and fourth levels of the hierarchy 600. In an example, the output from the fourth finite state machine engine 608 is sent to an external device as an output of the hierarchy 600 based on analysis of the hierarchy 600 on the input data received by the first finite state machine engine 602. Accordingly, the output from the fourth finite state machine engine 608 corresponds to the collective output for the hierarchy 600. In other examples, the output from other ones of the finite state machine engines 602, 604, or 606 can correspond to the collective output for the hierarchy 600.

The outputs from the second, third, and fourth finite state machine engines 604, 606, 608 can each be fed back to the programming interface 602B, 604B, 606B of the finite state machine engine 602, 604, 606 at the level below. For example, the output from the fourth finite state machine engine 608 is fed back into the programming interface 606B of the third finite state machine engine 606. The third finite state machine engine 606, therefore, can be reprogrammed based on the output from the fourth finite state machine engine 608. Accordingly, the third finite state machine engine 608 can modify its program during runtime. The first and second finite state machine engines 602, 604 can be similarly reprogrammed during runtime based on the outputs from the second and third finite state machine engines 604, 606 respectively.

In an example, the feedback from an output from a finite state machine engine 604, 606, 608 is processed (e.g., analyzed and compiled) to form a program for reprogramming a finite state machine engine 602, 604, 606. For example, the output from the finite state machine engine 608 can be analyzed and compiled by a processing device 614 before being sent to the programming interface 606B. The processing device 614 can generate the updated program for the finite state machine engine 606 based on the output from the finite state machine engine 608. The processing device 614 can analyze the output and compile the updated program for the third finite state machine engine 606. The updated program can then be loaded onto the third finite state machine engine 606 through the programming interface 606B to reprogram the third finite state machine engine 606. In an example, the updated program may contain only a partial change from the current program. Thus, in an example, an updated program replaces only a portion of a current program on a finite state machine engine 602, 604, 606, 608. In another example, an updated program replaces all or a large portion of a current program. Likewise, the processing devices 610, 612 can analyze and compile feedback in a similar manner based on the outputs from the second and third finite state machine engines 604, 606. A processing device 610, 612, 614 can be implemented with one or more additional finite state machines engines, or can be implemented with a different type of machine (e.g., a computer having a von Nuemann architecture).

In some examples, the processing devices 610, 612, 614 analyze the output from a higher level prior to compiling the new program. In an example, the processing devices 610, 612, 614 analyze the output to determine how to update the lower level program and then compile the new or updated lower level program based on the analysis. Although in the hierarchy 600, the feedback at a given finite state machine engine is received from the level directly above the given finite state machine engine, feedback can be from any level finite state machine engine to another finite state machine engine at a higher, lower, or the same level. For example, feedback can be received at a programming input of a finite state machine engine from the output of that same finite state machine engine, or from the output of another finite state machine engine at the same, higher, or lower levels. Additionally, a finite state machine engine can receive feedback from multiple different finite state machine engines. The reprogramming of finite state machine engines based on feedback may be disconnected in time from the identification of patterns in the input data (e.g., not real time with the processing of the raw data).

A purpose of sending information back down the hierarchy to affect reprogramming of the lower levels can be so that the lower levels may become more efficient at discerning patterns of interest. In some examples, the process of sending information to higher levels is avoided when possible, recognizing that it takes time to transfer information to higher levels of the hierarchy. In some examples, the higher levels can be essentially used to resolve the identification of patterns that are new to the system. This can be similar to the process used that takes place in the neocortex of a biological brain. In an example, if a pattern can be fully resolved at the lower levels, it should be. The feedback mechanism is one method to transfer "learning" to the lower levels of the hierarchy. This process of pushing information back down the hierarchy will help preserve the upper levels of the hierarchy for processing new or unfamiliar patterns. Furthermore, the entire recognition process can speed up by reducing the amount of data transfer through various levels of the hierarchy.

The feedback can make the lower levels of the hierarchy more acutely sensitive to the data stream at the input. A consequence of this "push down" of information is that decisions can be made at the lower levels of the hierarchy and can be done so quickly. Accordingly, in an example, the output from lower level finite state machine engines (e.g., the first finite state machine engine 602) can correspond to the collective output from the hierarchy 600 to another device along with the output from the fourth finite state machine engine 608. The external device can, for example, monitor the output from each of these finite state machine engines 602, 608 to determine when patterns have been identified by the hierarchy 600.

In an example, the feedback information can include identifying information corresponding to the data stream analyzed. For example, the identifying information can include an identifying characteristic of the data, format of the data, a protocol of the data, and/or any other type of identifying information. The identifying information may be collected, analyzed, and used to adapt the analysis method for the input data by, for example the processing device 610. A finite state machine engine may then be programmed with the adapted analysis method. The identifying information can include, for example, a language of the input data. The finite state machine engine can be initially programmed to determine a language of the input data and may be adapted (e.g., reprogrammed) during runtime once a language has been identified corresponding to the input. The adapted analysis method for the finite state machine engine can correspond more specifically to analysis methods for the identified language. Finally, the finite state machine engine may analyze future input data using the adapted analysis method. The feedback process may be iterative, so that additional identifying information may be found in the input data to allow for further adaptation of the analysis method.

Programs (also referred to herein as "images") for loading onto a finite state machine engine can be generated by a compiler as discussed below with respect to FIG. 19. In general, compiling can be a computationally intensive process, and can be most apparent when compiling large databases of pattern signatures for the first time. In runtime operation, finite state machines engines of higher levels can be providing feedback to the lower levels in the form of an incremental program update for the lower level finite state machine engine. Thus, the feedback information to the lower level finite state machine engine can be much smaller, incremental updates to an original program that are less computationally intensive to compile.

Figure 14:
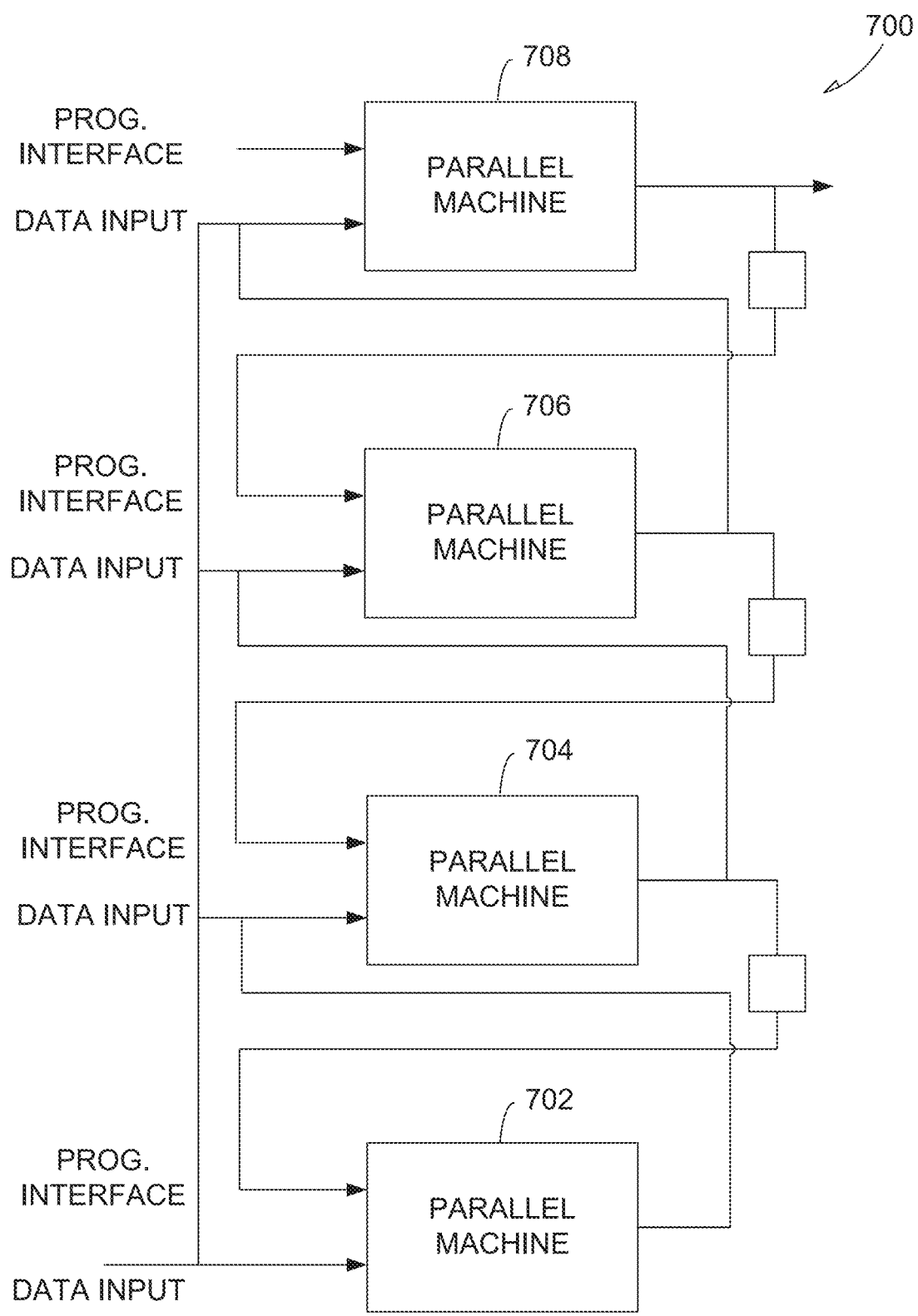
FIG. 14 illustrates another example of a four-level hierarchy having feedback implemented with parallel machines, according to various embodiments of the invention.

FIG. 14 illustrates another example of a four-level hierarchy 700 implemented with four finite state machine engines 702, 704, 706, 708. Here, the second, third, and fourth level finite state machine engines 704, 706, 708 receive input data from outputs of lower level as well as the raw data stream. Accordingly, the levels two, three, and four can identify patterns from combinations of the patterns from lower levels and the raw data.

As can be seen from FIGS. 13 and 14, finite state machine engines can be cascaded in almost any manner where the raw data input to the hierarchy, as well as an output from a finite state machine engine, can be sent to any other finite state machine engine, including itself. Moreover, the outputs from a given finite state machine engine can be sent to another finite state machine engine as input data and/or as feedback for updating the program for a finite state machine engine.

As noted above, due to the time for a finite state machine engine to process one bit (or word) of an input data stream, cascading finite state machine engines in series can increase the time to fully process the input data stream through all the finite state machine engines. The lowest level of the hierarchy will often receive the lowest (most granular) level of input. Accordingly, the lower levels should be expected to be more active than the output of high levels. That is, each successive level in the hierarchy can assemble higher level objects. In an example, a finite state machine engine has a maximum input rate that limits how fast input data can be fed to the finite state machine engine. This input rate can be thought of as a single data cycle. On each successive data cycle, the finite state machine engine has the potential to activate many final states. This could cause a finite state machine engine (especially at the lowest level of the hierarchy) to produce a significant amount of output (match) data. For example, if the input is provided as a stream of bytes to the lowest level finite state machine engine, on any given data cycle it may be possible for the finite state machine engine to generate multiple bytes of state information. If one byte of information can generate multiple bytes of state information, then the entire hierarchy of finite state machine engines should be synchronized so that information is passed up the hierarchy. The feedback does not need to be synchronized, however, the faster the feedback is received at a lower lever, the faster the lower level can adapt, and the more efficient the analysis.

As an example, a maximum size output for each level of the hierarchy (implemented with a single finite state machine engine) can equal 1024 bytes and a depth of the hierarchy can equal 4 levels. The input data stream data rate for a finite state machine engine can equal 128 MB/second. With these conditions each level of the hierarchy could be traversed in 7.63 microseconds. With a four level hierarchy, the total settling time of the entire stack of finite state machine engines would be 4 times 7.63 microseconds or 30.5 microseconds. With a 30.5 microsecond settling time, the implication is that the input data frequency should be limited to 32 KB/s.

Notably, this is highly dependent on the configuration of the finite state machine engines. Finite state machine engines can be configurable to tradeoff input data rates vs. the state machine size. In addition, the input word size to a finite state machine engine can be adjusted if corresponding modifications are made to the compiler that produced the individual images loaded on the finite state machine engines.

In an example, the methods to implement one or more FSMs as described with reference to FIGS. 1-14 could be implemented with software on a machine having a von Nuemann architecture. Accordingly, software instructions could cause a processor to implement a first level analysis FSM on a raw data stream. The output from the first level FSM could then be processed by the processor according to a second level FSM and so on. Furthermore, the feedback loop discussed above could be implemented by a processor that analyzes an output from a level of the FSM, and uses that to generate a new FSM for one or more of the levels.

FIGS. 15-18 illustrate an example of a parallel machine referred to herein as "FSM engine 800". In an example, the FSM engine 800 comprises a hardware implementation of a finite state machine. Accordingly, the FSM engine 800 implements a plurality of selectively coupleable hardware elements (e.g., programmable elements) that correspond to a plurality of states in a FSM. Similar to a state in a FSM, a hardware element can analyze an input stream and activate a downstream hardware element based on the input stream.

The FSM engine 800 includes a plurality of programmable elements including general purpose elements and special purpose elements. The general purpose elements can be programmed to implement many different functions. These general purpose elements include SMEs 804, 805 (shown in FIG. 18) that are hierarchically organized into rows 806 (shown in FIGS. 16 and 17) and blocks 802 (shown in FIGS. 15 and 16). To route signals between the hierarchically organized SMEs 804, 805, a hierarchy of programmable switches is used including inter-block switches 803 (shown in FIGS. 15 and 16), intra-block switches 808 (shown in FIGS. 9 and 10) and intra-row switches 812 (shown in FIG. 17). A SME 804, 805 can correspond to a state of a FSM implemented by the FSM engine 800. The SMEs 804, 805 can be coupled together by using the programmable switches as described below. Accordingly, a FSM can be implemented on the FSM engine 800 by programming the SMEs 804, 805 to correspond to the functions of states and by selectively coupling together the SMEs 804, 805 to correspond to the transitions between states in the FSM.

FIG. 15 illustrates an overall view of an example FSM engine 800. The FSM engine 800 includes a plurality of blocks 802 that can be selectively coupled together with programmable inter-block switches 803. Additionally, the blocks 802 can be selectively coupled to an input block 809 (e.g., a data input port) for receiving signals (e.g., data) and providing the data to the blocks 802. The blocks 802 can also be selectively coupled to an output block 813 (e.g., an output port) for providing signals from the blocks 802 to an external device (e.g., another FSM engine 800). The FSM engine 800 can also include a programming interface 811 to load a program (e.g., an image) onto the FSM engine 800. The image can program (e.g., set) the state of the SMEs 804, 805. That is, the image can configure the SMEs 804, 805 to react in a certain way to a given input at the input block 809. For example, a SME 804 can be set to output a high signal when the character 'a' is received at the input block 809.

In an example, the input block 809, the output block 813, and/or the programming interface 811 can be implemented as registers such that writing to the registers provides data to or from the respective elements. Accordingly, bits from the image stored in the registers corresponding to the programming interface 811 can be loaded on the SMEs 804, 805. Although FIG. 15 illustrates a certain number of conductors (e.g., wire, trace) between a block 802, input block 809, output block 813, and an inter-block switch 803, it should be understood that in other examples, fewer or more conductors can be used.

Figure 16:
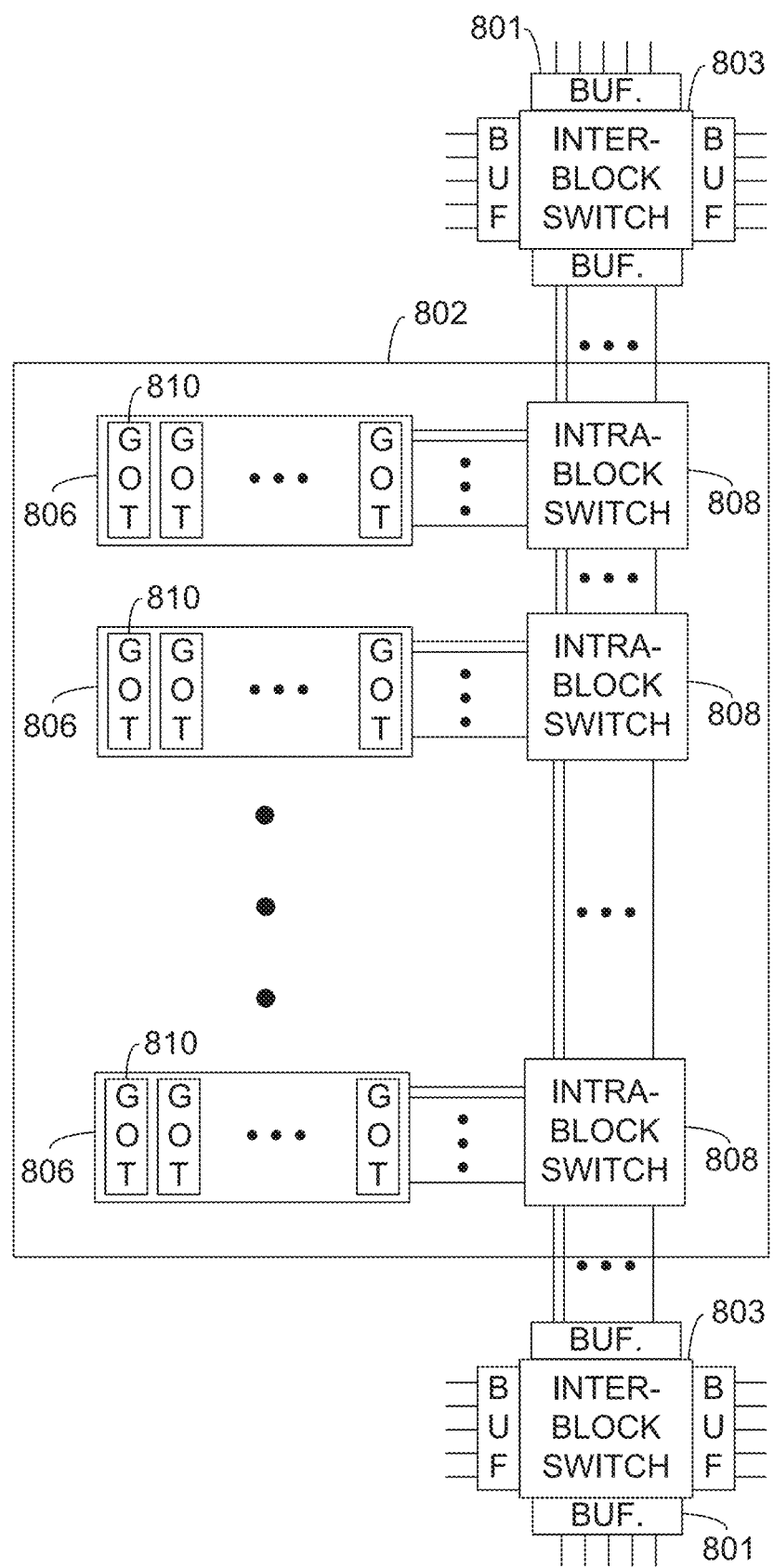
FIG. 16 illustrates an example of a block of the finite state machine engine of FIG. 15, according to various embodiments of the invention.

FIG. 16 illustrates an example of a block 802. A block 802 can include a plurality of rows 806 that can be selectively coupled together with programmable intra-block switches 808. Additionally, a row 806 can be selectively coupled to another row 806 within another block 802 with the inter-block switches 803. In an example, buffers 801 are included to control the timing of signals to/from the inter-block switches 803. A row 806 includes a plurality of SMEs 804, 805 organized into pairs of elements that are referred to herein as groups of two (GOTs) 810. In an example, a block 802 comprises sixteen (16) rows 806.

Figure 17:
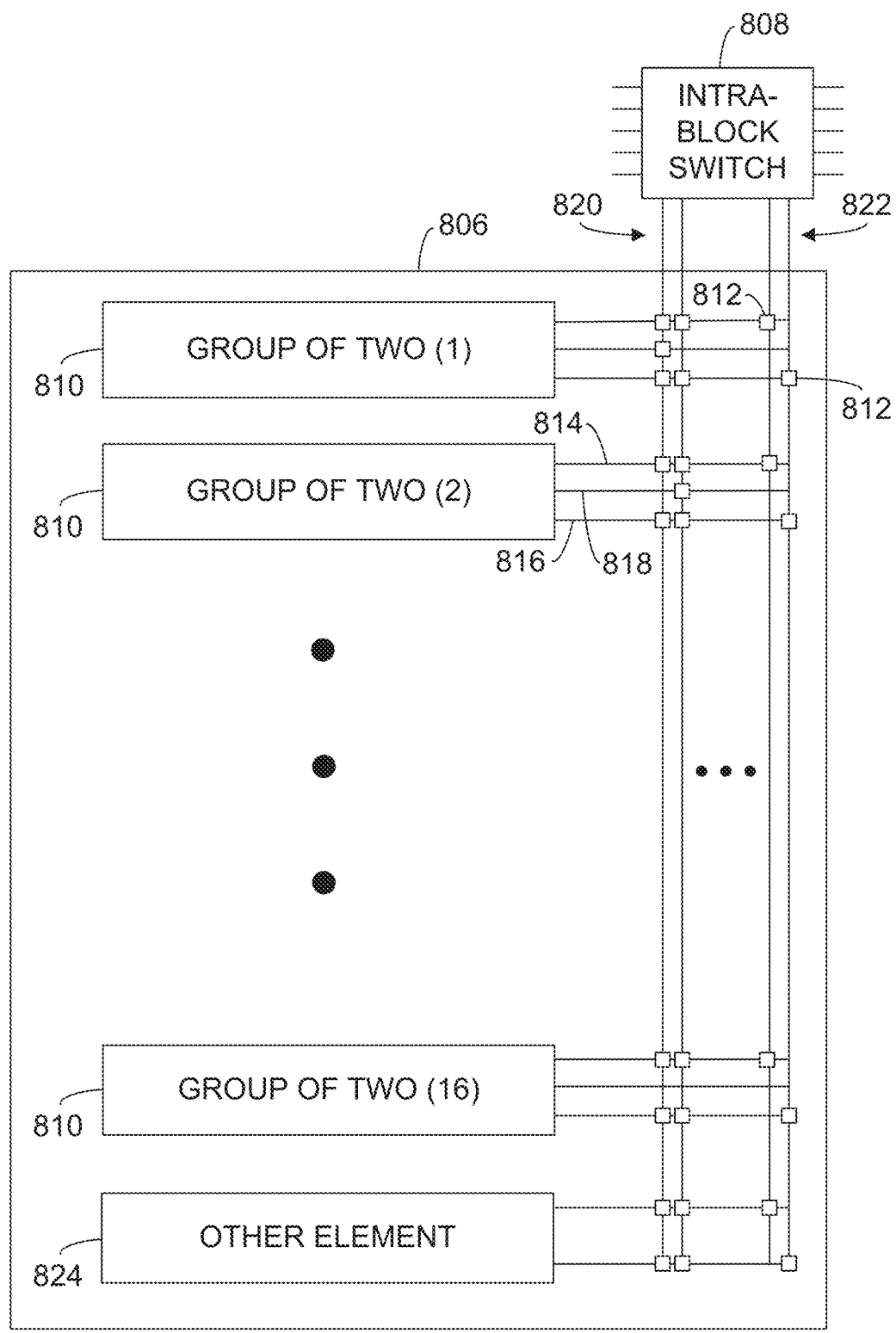
FIG. 17 illustrates an example of a row of the block of FIG. 16, according to various embodiments of the invention.

FIG. 17 illustrates an example of a row 806. A GOT 810 can be selectively coupled to other GOTs 810 and any other elements 824 within the row 806 by programmable intra-row switches 812. A GOT 810 can also be coupled to other GOTs 810 in other rows 806 with the intra-block switch 808, or other GOTs 810 in other blocks 802 with an inter-block switch 803. In an example, a GOT 810 has a first and second input 814, 816, and an output 818. The first input 814 is coupled to a first SME 804 of the GOT 810 and the second input 816 is coupled to a second SME 805 of the GOT 810.

In an example, the row 806 includes a first and second plurality of row interconnection conductors 820, 822. In an example, an input 814, 816 of a GOT 810 can be coupled to one or more row interconnection conductors 820, 822, and an output 818 can be coupled to one row interconnection conductor 820, 822. In an example, a first plurality of the row interconnection conductors 820 can be coupled to each SME 804 of each GOT 810 within the row 806. A second plurality of the row interconnection conductors 822 can be coupled to one SME 804 of each GOT 810 within the row 806, but cannot be coupled to the other SME 805 of the GOT 810. In an example, a first half of the second plurality of row interconnection conductors 822 can couple to first half of the SMEs 804 within a row 806 (one SME 804 from each GOT 810) and a second half of the second plurality of row interconnection conductors 822 can couple to a second half of the SMEs 805 within a row 806 (the other SME 804 from each GOT 810). The limited connectivity between the second plurality of row interconnection conductors 822 and the SMEs 804, 805 is referred to herein as "parity". In an example, the row 806 can also include a special purpose element 824 such as a counter, a programmable Boolean logic element, a field programmable gate array (FPGA), an application specific integrated circuit (ASIC), a programmable processor (e.g., a microprocessor), and other elements.

In an example, the special purpose element 824 includes a counter (also referred to herein as counter 824). In an example, the counter 824 comprises a 12-bit programmable down counter. The 12-bit programmable counter 824 has a counting input, a reset input, and zero-count output. The counting input, when asserted, decrements the value of the counter 824 by one. The reset input, when asserted, causes the counter 824 to load an initial value from an associated register. For the 12-bit counter 824, up to a 12-bit number can be loaded in as the initial value. When the value of the counter 824 is decremented to zero (0), the zero-count output is asserted. The counter 824 also has at least two modes, pulse and hold. When the counter 824 is set to pulse mode, the zero-count output is asserted during the clock cycle when the counter 824 decrements to zero, and at the next clock cycle the zero-count output is no longer asserted. When the counter 824 is set to hold mode the zero-count output is asserted during the clock cycle when the counter 824 decrements to zero, and stays asserted until the counter 824 is reset by the reset input being asserted. In an example, the special purpose element 824 includes Boolean logic. In some examples, this Boolean logic can be used to extract information from terminal state SMEs in FSM engine 800. The information extracted can be used to transfer state information to other FSM engines 800 and/or to transfer programming information used to reprogram FSM engine 800, or to reprogram another FSM engine 800.

Figure 18:
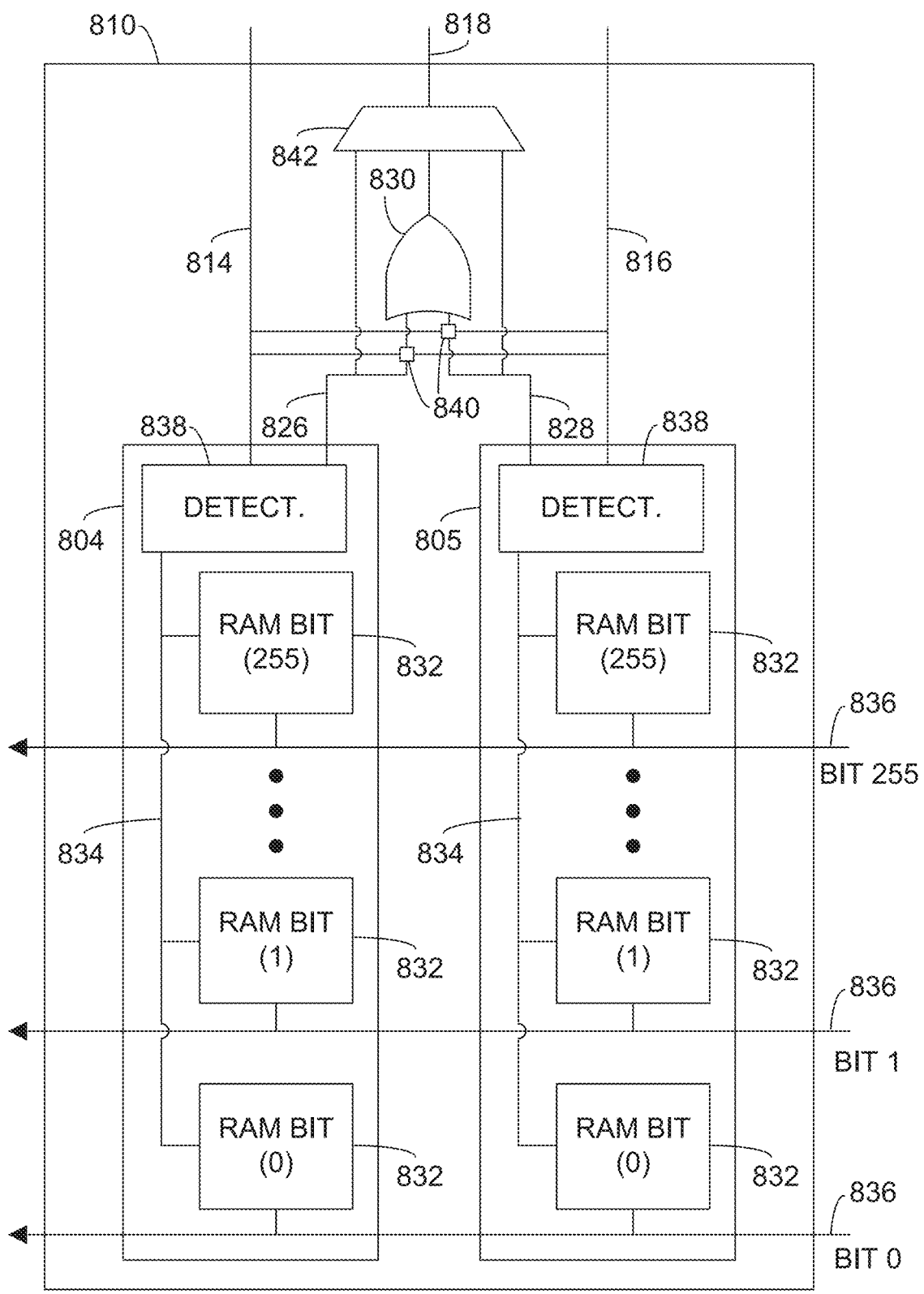
FIG. 18 illustrates an example of a group of two of the row of FIG. 10, according to various embodiments of the invention.

FIG. 18 illustrates an example of a GOT 810. The GOT 810 includes a first SME 804 and a second SME 805 having inputs 814, 816 and having their outputs 826, 828 coupled to an OR gate 830 and a 3-to-1 multiplexer 842. The 3-to-1 multiplexer 842 can be set to couple the output 818 of the GOT 810 to either the first SME 804, the second SME 805, or the OR gate 830. The OR gate 830 can be used to couple together both outputs 826, 828 to form the common output 818 of the GOT 810. In an example, the first and second SME 804, 805 exhibit parity, as discussed above, where the input 814 of the first SME 804 can be coupled to some of the row interconnect conductors 822 and the input 816 of the second SME 805 can be coupled to other row interconnect conductors 822. In an example, the two SMEs 804, 805 within a GOT 810 can be cascaded and/or looped back to themselves by setting either or both of switches 840. The SMEs 804, 805 can be cascaded by coupling the output 826, 828 of the SMEs 804, 805 to the input 814, 816 of the other SME 804, 805. The SMEs 804, 805 can be looped back to themselves by coupling the output 826, 828 to their own input 814, 816. Accordingly, the output 826 of the first SME 804 can be coupled to neither, one, or both of the input 814 of the first SME 804 and the input 816 of the second SME 805.

In an example, a state machine element 804, 805 comprises a plurality of memory cells 832, such as those often used in dynamic random access memory (DRAM), coupled in parallel to a detect line 834. One such memory cell 832 comprises a memory cell that can be set to a data state, such as one that corresponds to either a high or a low value (e.g., a 1 or 0). The output of the memory cell 832 is coupled to the detect line 834 and the input to the memory cell 832 receives signals based on data on the data stream line 836. In an example, an input on the data stream line 836 is decoded to select one of the memory cells 832. The selected memory cell 832 provides its stored data state as an output onto the detect line 834. For example, the data received at the data input port 809 can be provided to a decoder (not shown) and the decoder can select one of the data stream lines 836. In an example, the decoder can convert an ACSII character to 1 of 256 bits.

A memory cell 832, therefore, outputs a high signal to the detect line 834 when the memory cell 832 is set to a high value and the data on the data stream line 836 corresponds to the memory cell 832. When the data on the data stream line 836 corresponds to the memory cell 832 and the memory cell 832 is set to a low value, the memory cell 832 outputs a low signal to the detect line 834. The outputs from the memory cells 832 on the detect line 834 are sensed by a detect circuit 838. In an example, the signal on an input line 814, 816 sets the respective detect circuit 838 to either an active or inactive state. When set to the inactive state, the detect circuit 838 outputs a low signal on the respective output 826, 828 regardless of the signal on the respective detect line 834. When set to an active state, the detect circuit 838 outputs a high signal on the respective output line 826, 828 when a high signal is detected from one of the memory cells 834 of the respective SME 804, 805. When in the active state, the detect circuit 838 outputs a low signal on the respective output line 826, 828 when the signals from all of the memory cells 834 of the respective SME 804, 805 are low.

In an example, an SME 804, 805 includes 256 memory cells 832 and each memory cell 832 is coupled to a different data stream line 836. Thus, an SME 804, 805 can be programmed to output a high signal when a selected one or more of the data stream lines 836 have a high signal thereon. For example, the SME 804 can have a first memory cell 832 (e.g., bit 0) set high and all other memory cells 832 (e.g., bits 1-255) set low. When the respective detect circuit 838 is in the active state, the SME 804 outputs a high signal on the output 826 when the data stream line 836 corresponding to bit 0 has a high signal thereon. In other examples, the SME 804 can be set to output a high signal when one of multiple data stream lines 836 have a high signal thereon by setting the appropriate memory cells 832 to a high value.

In an example, a memory cell 832 can be set to a high or low value by reading bits from an associated register. Accordingly, the SMEs 804 can be programmed by storing an image created by the compiler into the registers and loading the bits in the registers into associated memory cells 832. In an example, the image created by the compiler includes a binary image of high and low (e.g., 1 and 0) bits. The image can program the FSM engine 800 to operate as a FSM by cascading the SMEs 804, 805. For example, a first SME 804 can be set to an active state by setting the detect circuit 838 to the active state. The first SME 804 can be set to output a high signal when the data stream line 836 corresponding to bit 0 has a high signal thereon. The second SME 805 can be initially set to an inactive state, but can be set to, when active, output a high signal when the data stream line 836 corresponding to bit 1 has a high signal thereon. The first SME 804 and the second SME 805 can be cascaded by setting the output 826 of the first SME 804 to couple to the input 816 of the second SME 805. Thus, when a high signal is sensed on the data stream line 836 corresponding to bit 0, the first SME 804 outputs a high signal on the output 826 and sets the detect circuit 838 of the second SME 805 to an active state. When a high signal is sensed on the data stream line 836 corresponding to bit 1, the second SME 805 outputs a high signal on the output 828 to activate another SME 504, SME 805 or for output from the FSM engine 800.

Figure 19:
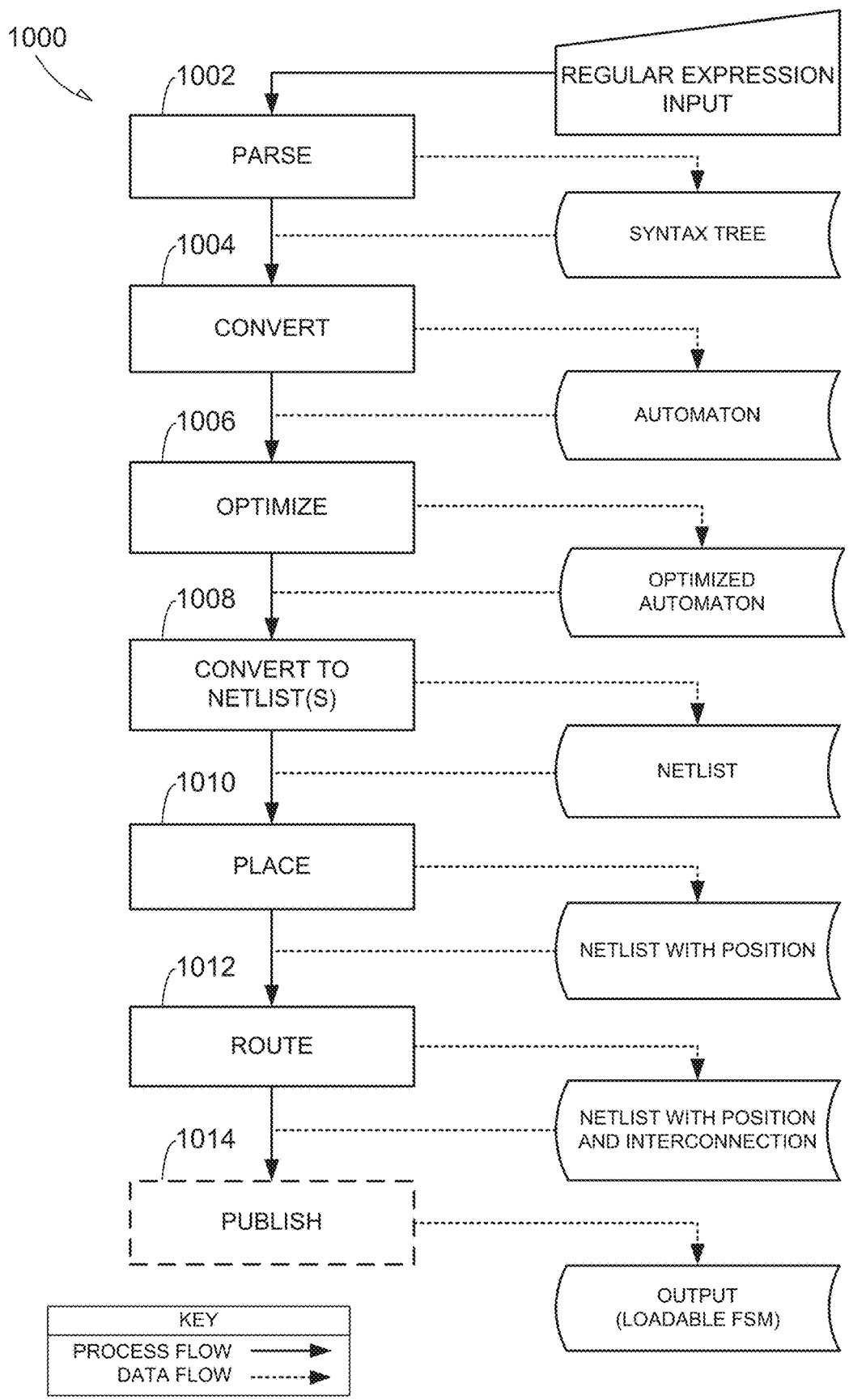
FIG. 19 illustrates an example of a method for a compiler to convert source code into an image for programming of the finite state machine of FIG. 8, according to various embodiments of the invention.

FIG. 19 illustrates an example of a method 1000 for a compiler to convert source code into an image configured to program a parallel machine. Method 1000 includes parsing the source code into a syntax tree (block 1002), converting the syntax tree into an automaton (block 1004), optimizing the automaton (block 1006), converting the automaton into a netlist (block 1008), placing the netlist on hardware (block 1010), routing the netlist (block 1012), and publishing the resulting image (block 1014).

Figure 20:
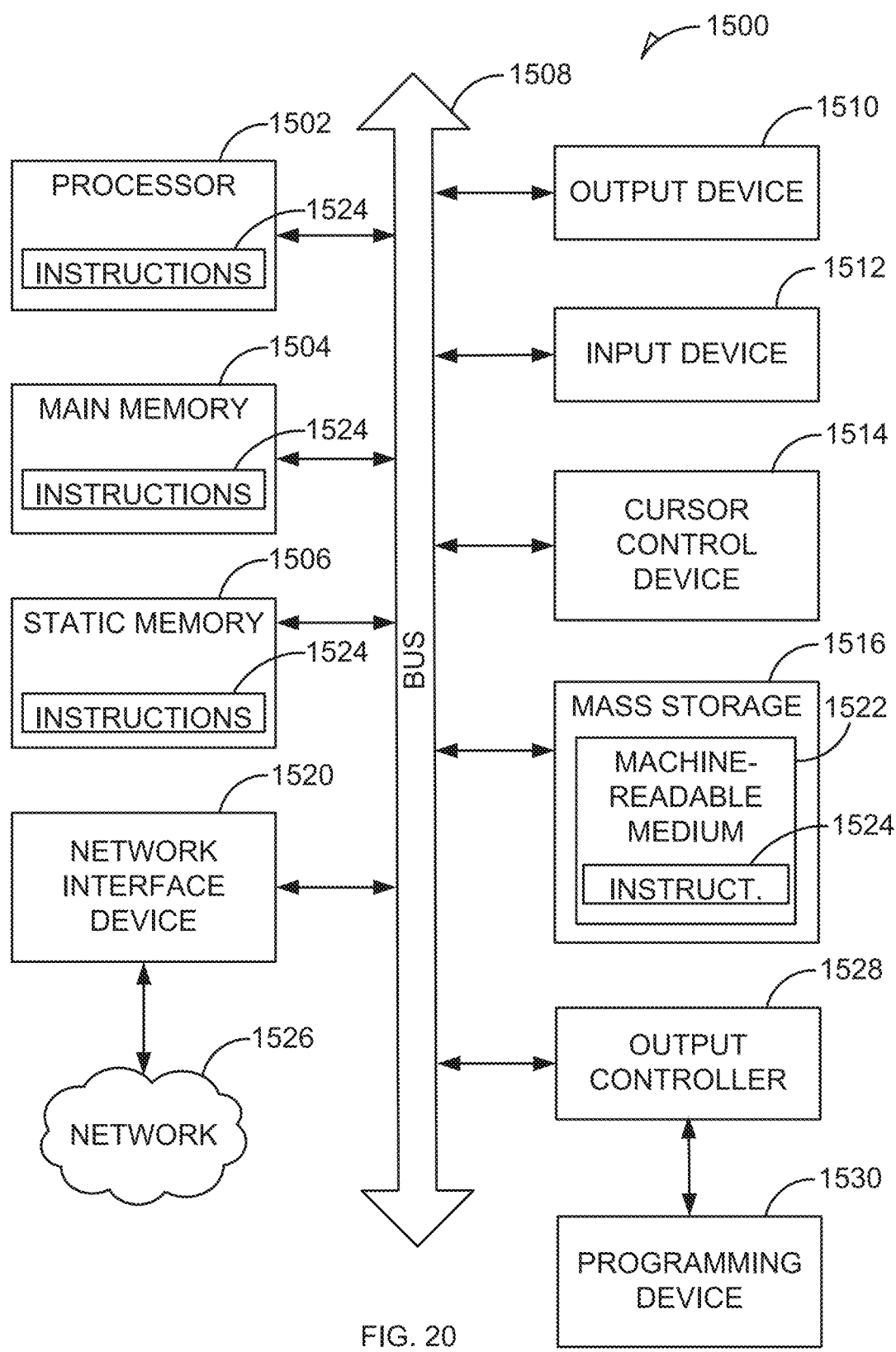
FIG. 20 illustrates an example of a computer having a Von Nuemann based architecture, according to various embodiments of the invention.

In an example, the compiler includes an application programming interface (API) that allows software developers to create images for implementing FSMs on the FSM engine 800. The compiler provides methods to convert an input set of regular expressions in the source code into an image that is configured to program the FSM engine 800. The compiler can be implemented by instructions for a computer having a von Neumann architecture. These instructions can cause a processor on the computer to implement the functions of the compiler. For example, the instructions, when executed by the processor, can cause the processor to perform actions as described in blocks 1002, 1004, 1006, 1008, 1010, 1012, and 1014 on source code that is accessible to the processor. An example computer having a von Neumann architecture is shown in FIG. 20 and described below.

In an example, the source code describes search strings for identifying patterns of symbols within a group of symbols. To describe the search strings, the source code can include a plurality of regular expressions (regexes). A regex can be a string for describing a symbol search pattern. Regexes are widely used in various computer domains, such as programming languages, text editors, network security, and others. In an example, the regular expressions supported by the compiler include search criteria for the search of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and .NET languages.

At block 1002 the compiler can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexes in the source code in the form of a tree graph known as a syntax tree. The examples described herein refer to the arrangement as a syntax tree (also known as an "abstract syntax tree") in other examples, however, a concrete syntax tree or other arrangement can be used.

Since, as mentioned above, the compiler can support multiple languages of source code, parsing converts the source code, regardless of the language, into a non-language specific representation, e.g., a syntax tree. Thus, further processing (blocks 1004, 1006, 1008, 1010) by the compiler can work from a common input structure regardless of the language of the source code.

As noted above, the syntax tree includes a plurality of operators that are relationally connected. A syntax tree can include multiple different types of operators. That is, different operators can correspond to different functions implemented by the regexes in the source code.

At block 1004, the syntax tree is converted into an automaton. An automaton comprises a software model of a FSM and can accordingly be classified as deterministic or non-deterministic. A deterministic automaton has a single path of execution at a given time, while a non-deterministic automaton has multiple concurrent paths of execution. The automaton comprises a plurality of states. In order to convert the syntax tree into an automaton, the operators and relationships between the operators in the syntax tree are converted into states with transitions between the states. In an example, the automaton can be converted based partly on the hardware of the FSM engine 800.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol α, i.e. δ(p,α), is shown by a directed connection from node p to node q. In an example, a reversal of an automaton produces a new automaton where each transition p→q on some symbol α is reversed q→p on the same symbol. In a reversal, start state becomes a final state and the final states become start states. In an example, the language accepted (e.g., matched) by an automaton is the set of all possible character strings which when input sequentially into the automaton will reach a final state. Each string in the language accepted by the automaton traces a path from the start state to one or more final states.

At block 1006, after the automaton is constructed, the automaton is optimized to, among other things, reduce its complexity and size. The automaton can be optimized by combining redundant states.

At block 1008, the optimized automaton is converted into a netlist. Converting the automaton into a netlist maps each state of the automaton to a hardware element (e.g., SMEs 804, 805, other elements 824) on the FSM engine 800, and determines the connections between the hardware elements.

At block 1010, the netlist is placed to select a specific hardware element of the target device (e.g., SMEs 804, 805, special purpose elements 824) corresponding to each node of the netlist. In an example, placing selects each specific hardware element based on general input and output constraints for of the FSM engine 800.

At block 1012, the placed netlist is routed to determine the settings for the programmable switches (e.g., inter-block switches 803, intra-block switches 808, and intra-row switches 812) in order to couple the selected hardware elements together to achieve the connections describe by the netlist. In an example, the settings for the programmable switches are determined by determining specific conductors of the FSM engine 800 that will be used to connect the selected hardware elements, and the settings for the programmable switches. Routing can take into account more specific limitations of the connections between the hardware elements than placement at block 1010. Accordingly, routing may adjust the location of some of the hardware elements as determined by the global placement in order to make appropriate connections given the actual limitations of the conductors on the FSM engine 800.

Once the netlist is placed and routed, the placed and routed netlist can be converted into a plurality of bits for programming of a FSM engine 800. The plurality of bits are referred to herein as an image.

At block 1014, an image is published by the compiler. The image comprises a plurality of bits for programming specific hardware elements and/or programmable switches of the FSM engine 800. In embodiments where the image comprises a plurality of bits (e.g., 0 and 1), the image can be referred to as a binary image. The bits can be loaded onto the FSM engine 800 to program the state of SMEs 804, 805, the special purpose elements 824, and the programmable switches such that the programmed FSM engine 800 implements a FSM having the functionality described by the source code. Placement (block 1010) and routing (block 1012) can map specific hardware elements at specific locations in the FSM engine 800 to specific states in the automaton. Accordingly, the bits in the image can program the specific hardware elements and/or programmable switches to implement the desired function(s). In an example, the image can be published by saving the machine code to a computer readable medium. In another example, the image can be published by displaying the image on a display device. In still another example, the image can be published by sending the image to another device, such as a programming device for loading the image onto the FSM engine 800. In yet another example, the image can be published by loading the image onto a parallel machine (e.g., the FSM engine 800).

In an example, an image can be loaded onto the FSM engine 800 by either directly loading the bit values from the image to the SMEs 804, 805 and other hardware elements 824 or by loading the image into one or more registers and then writing the bit values from the registers to the SMEs 804, 805 and other hardware elements 824. In an example, the state of the programmable switches (e.g., inter-block switches 803, intra-block switches 808, and intra-row switches 812). In an example, the hardware elements (e.g., SMEs 804, 805, other elements 824, programmable switches 803, 808, 812) of the FSM engine 800 are memory mapped such that a programming device and/or computer can load the image onto the FSM engine 800 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

FIG. 20 illustrates generally an example of a computer 1500 having a von Neumann architecture. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that can be employed to create one or more software programs designed to implement and perform the methods disclosed herein. The programs can be structured in an object-orientated format using an object-oriented language, such as Java, C++, or one or more other languages. Alternatively, the programs can be structured in a procedure-orientated format using a procedural language, such as assembly, C, etc. The software components can communicate using any of a number of mechanisms well known to those of ordinary skill in the art, such as application program interfaces or interprocess communication techniques, including remote procedure calls or others. The teachings of various embodiments are not limited to any particular programming language or environment.

Thus, other embodiments can be realized. For example, an article of manufacture, such as a computer, a memory system, a magnetic or optical disk, some other storage device, or any type of electronic device or system can include one or more processors 1502 coupled to a computer-readable medium 1522 such as a memory (e.g., removable storage media, as well as any memory including an electrical, optical, or electromagnetic conductor) having instructions 1524 stored thereon (e.g., computer program instructions), which when executed by the one or more processors 1502 result in performing any of the actions described with respect to the methods above.

The computer 1500 can take the form of a computer system having a processor 1502 coupled to a number of components directly, and/or using a bus 1508. Such components can include main memory 1504, static or non-volatile memory 1506, and mass storage 1516. Other components coupled to the processor 1502 can include an output device 1510, such as a video display, an input device 1512, such as a keyboard, and a cursor control device 1514, such as a mouse. A network interface device 1520 to couple the processor 1502 and other components to a network 1526 can also be coupled to the bus 1508. The instructions 1524 can further be transmitted or received over the network 1526 via the network interface device 1520 utilizing any one of a number of well-known transfer protocols (e.g., HTTP). Any of these elements coupled to the bus 1508 can be absent, present singly, or present in plural numbers, depending on the specific embodiment to be realized.

In an example, one or more of the processor 1502, the memories 1504, 1506, or the storage device 1516 can each include instructions 1524 that, when executed, can cause the computer 1500 to perform any one or more of the methods described herein. In alternative embodiments, the computer 1500 operates as a standalone device or can be connected (e.g., networked) to other devices. In a networked environment, the computer 1500 can operate in the capacity of a server or a client device in server-client network environment, or as a peer device in a peer-to-peer (or distributed) network environment. The computer 1500 can include a personal computer (PC), a tablet PC, a set-top box (STB), a Personal Digital Assistant (PDA), a cellular telephone, a web appliance, a network router, switch or bridge, or any device capable of executing a set of instructions (sequential or otherwise) that specify actions to be taken by that device. Further, while only a single computer 1500 is illustrated, the term "computer" shall also be taken to include any collection of devices that individually or jointly execute a set (or multiple sets) of instructions to perform any one or more of the methodologies discussed herein.

The computer 1500 can also include an output controller 1528 for communicating with peripheral devices using one or more communication protocols (e.g., universal serial bus (USB), IEEE 1394, etc.) The output controller 1528 can, for example, provide an image to a programming device 1530 that is communicatively coupled to the computer 1500. The programming device 1530 can be configured to program a parallel machine (e.g., parallel machine 100, FSM engine 800). In other examples, the programming device 1530 can be integrated with the computer 1500 and coupled to the bus 1508 or can communicate with the computer 1500 via the network interface device 1520 or another device.

While the computer-readable medium 1524 is shown as a single medium, the term "computer-readable medium" should be taken to include a single medium or multiple media (e.g., a centralized or distributed database, or associated caches and servers, and or a variety of storage media, such as the processor 1502 registers, memories 1504, 1506, and the storage device 1516) that store the one or more sets of instructions 1524. The term "computer-readable medium" shall also be taken to include any medium that is capable of storing, encoding or carrying a set of instructions for execution by the computer and that cause the computer to perform any one or more of the methodologies of the present invention, or that is capable of storing, encoding or carrying data structures utilized by or associated with such a set of instructions. The term "computer-readable medium" shall accordingly be taken to include, but not be limited to tangible media, such as solid-state memories, optical, and magnetic media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

EXAMPLE EMBODIMENTS

Example 1 includes a programmable device having a plurality of programmable elements, wherein the programmable elements are configured to implement one or more finite state machines, wherein the plurality of programmable elements are configured to receive a N-digit input and provide a M-digit output as a function of the N-digit input, wherein the M-digit output includes state information from less than all of the programmable elements.

Example 2 includes a hierarchical parallel machine having a first parallel machine comprising a plurality of programmable elements, wherein the programmable elements are configured to implement one or more finite state machines, wherein the plurality of programmable elements are configured to receive a N-digit input and provide a M-digit output as a function of the N-digit input, wherein the M-digit output includes state information from less than all of the programmable elements; and a second parallel machine configured to receive and process at least part of the M-digit output.

Example 3 includes a programmable device having a plurality of programmable elements wherein the programmable elements are configured to implement one or more finite state machines, wherein the plurality of programmable elements are configured to receive a N-digit input and provide a M-digit output as a function of the N-digit input, wherein the M-digit output is formed by compressing state information from each of the programmable elements.

Example 4 includes a hierarchical parallel machine having a first parallel machine comprising a plurality of programmable elements, wherein the programmable elements are configured to implement one or more finite state machines, wherein the plurality of programmable elements are configured to receive a N-digit input and provide a M-digit output as a function of the N-digit input, wherein the M-digit output is formed by compressing state information from each of the programmable elements.

Example 5 includes a method of providing state information from a parallel machine to another device, wherein the parallel machine includes a plurality of programmable elements, wherein each of the programmable elements is configured to have a corresponding state. The method includes determining state information, wherein the state information comprises the state of each of the programmable elements in the parallel machine; compressing the state information; and providing the compressed state information to the other device Example 6 includes a hierarchical parallel machine having a first level parallel machine having at least one N-digit input and a plurality of N-digit outputs, wherein each of the N-digit outputs corresponds to a respective group of N state machines implemented on the first level parallel machine.

Example 7 includes a parallel machine comprising a plurality of programmable elements configured to implement at least one finite state machine. The parallel making is configured to determine state information, wherein the state information comprises the state of each of the programmable elements; compress the state information; and provide the compressed state information to another device.

In Example 8, the subject matter of any of Examples 1-7 can optionally include wherein the plurality of programmable elements comprises one of two or more groups of programmable elements.

In Example 9, the subject matter of any of Examples 1-8 can optionally include an N-digit input interface coupled to the one group of programmable elements and configured to receive the N-digit input; and a M-digit output interface coupled to the one group of programmable elements and configured to provide the M-digit output In Example 10, the subject matter of any of Examples 1-9 can optionally include wherein the one group of programmable elements comprises a block of programmable elements.

In Example 11, the subject matter of any of Examples 1-10 can optionally include wherein the block of programmable elements comprises a plurality of rows of programmable elements, wherein each of the rows is coupled to a respective one of a plurality of intra-block switches.

In Example 12, the subject matter of any of Examples 1-11 can optionally include wherein the programmable elements in each of the rows comprises: a plurality of groups of two state machine elements; and another programmable element.

In Example 13, the subject matter of any of Examples 1-12 can optionally include a programmable switch configured to selectively couple the one group of programmable elements to another one of the groups of programmable elements, an input port, and/or an output port.

In Example 14, the subject matter of any of Examples 1-13 can optionally include a register configured to store a program configured to program the plurality of programmable elements and the plurality of programmable switches.

In Example 15, the subject matter of any of Examples 1-14 can optionally include wherein N equals M.

In Example 16, the subject matter of any of Examples 1-15 can optionally include wherein M is an integer multiple of N.

In Example 17, the subject matter of any of Examples 1-16 can optionally include OR logic configured to aggregate output from two or more of the programmable elements used to implement a same one of the finite state machines.

In Example 18, the subject matter of any of Examples 1-17 can optionally include wherein the programmable elements are configured to implement a logical group of N state machines, wherein the outputs of the N state machines are aggregated to provide the M-digit output.

In Example 19, the subject matter of any of Examples 1-18 can optionally include wherein the logic comprises an OR gate.

In Example 20, the subject matter of any of Examples 1-19 can optionally include wherein the state information included in the M-digit output comprises compressed state information.

In Example 21, the subject matter of any of Examples 1-20 can optionally include wherein the plurality of programmable elements comprise state machine elements.

In Example 22, the subject matter of any of Examples 1-21 can optionally include wherein the M-digit output comprises a difference vector.

In Example 23, the subject matter of any of Examples 1-22 can optionally include wherein each state in the implemented one or more finite state machines corresponds to a respective digit in a state vector, and wherein the difference vector includes only those digits in the state vector that change in response to an input symbol provided to the programmable device.

In Example 24, the subject matter of any of Examples 1-23 can optionally include wherein each state in the implemented one or more finite state machines corresponds to a respective digit in a state vector, and wherein the M-digit output comprises only a subset of the digits in the state vector.

In Example 25, the subject matter of any of Examples 1-24 can optionally include wherein the subset of the digits comprises those digits corresponding to final states in the one or more finite state machines.

In Example 26, the subject matter of any of Examples 1-25 can optionally include wherein all state machines implemented in the device receive the N-digit input.

In Example 27, the subject matter of any of Examples 1-26 can optionally include wherein the plurality of programmable elements comprise one of two or more groups of programmable elements, wherein each of the groups has its own dedicated input.

In Example 28, the subject matter of any of Examples 1-27 can optionally include wherein the N-digit input is on a bottom of a semiconductor die, and wherein the M-digit output is on a top of the semiconductor die.

In Example 29, the subject matter of any of Examples 1-28 can optionally include wherein the plurality of programmable elements comprise one of two or more groups of programmable elements, and wherein the programmable device is configured to provide state information from one of the groups to another one of the groups in the programmable device.

In Example 30, the subject matter of any of Examples 1-29 can optionally include wherein the second parallel machine is configured to receive and process the whole M-digit output.

In Example 31, the subject matter of any of Examples 1-30 can optionally include an input bus coupled to the first parallel machine and configured to provide the N-digit input; and an output bus coupled between the first parallel machine and the second parallel machine, the output bus being configured to provide at least part of the M-digit output to the second parallel machine.

In Example 32, the subject matter of any of Examples 1-31 can optionally include wherein the input bus and output bus are equal in size.

In Example 33, the subject matter of any of Examples 1-32 can optionally include wherein the corresponding groups in the first and second parallel machines are coupled by a respective group of interconnects.

In Example 34, the subject matter of any of Examples 1-33 can optionally include wherein the M-digit output is provided to each state machine implemented in the second parallel machine.

In Example 35, the subject matter of any of Examples 1-34 can optionally include wherein the second parallel machine comprises a plurality of programmable elements grouped into a plurality of groups, wherein the M-digit output is provided to a respective one of the groups according to a pre-defined manner.

In Example 36, the subject matter of any of Examples 1-35 can optionally include wherein the second parallel machine comprises a plurality of programmable elements configured to send address information to the second parallel machine, wherein the address information indicates to which of the groups in the second parallel machine the M-digit output is being provided.

In Example 37, the subject matter of any of Examples 1-36 can optionally include wherein the parallel machines are stacked.

In Example 38, the subject matter of any of Examples 1-37 can optionally include wherein the plurality of programmable elements comprise one of two or more groups of programmable elements, further comprising logic corresponding to each group, wherein the logic corresponding to a respective one of the groups aggregates state information from two or more programmable elements in that group, and wherein one or more digits of the M-digit output from that group is a function of such logic.

In Example 39, the subject matter of any of Examples 1-38 can optionally include wherein the M-digit output is formed by compressing state information from the programmable elements.

In Example 40, the subject matter of any of Examples 1-39 can optionally include logic configured to aggregate output from two or more of the programmable elements used to implement a same one of the finite state machines.

In Example 41, the subject matter of any of Examples 1-40 can optionally include wherein the programmable elements are configured to implement a logical group of N state machines, wherein the outputs of the N state machines are aggregated to provide the M-digit output.

In Example 42, the subject matter of any of Examples 1-41 can optionally include wherein compressing the state information includes applying a lossless compression algorithm to the state information.

In Example 43, the subject matter of any of Examples 1-42 can optionally include wherein providing the compressed state information to the other device comprises providing the compressed state information to another parallel machine.

In Example 44, the subject matter of any of Examples 1-43 can optionally include wherein providing the compressed state information to the other device comprises providing the compressed state information to system memory.

In Example 45, the subject matter of any of Examples 1-44 can optionally include wherein compressing the state information comprises aggregating final states in a finite state machine implemented on the parallel machine.

In Example 46, the subject matter of any of Examples 1-45 can optionally include a first level parallel machine having at least one N-digit input and a plurality of N-digit outputs, wherein each of the N-digit outputs corresponds to a respective group of N state machines implemented on the first level parallel machine.

In Example 47, the subject matter of any of Examples 1-46 can optionally include wherein at least one of the state machines implemented on the first level parallel machine includes a plurality of programmable elements corresponding to a plurality of final states of the at least one state machine, wherein the output of the plurality of programmable elements corresponding to the plurality of final states are aggregated together to provide one digit of one of the N-digit outputs.

In Example 48, the subject matter of any of Examples 1-47 can optionally include wherein data provided on one of the N-digit outputs encodes the status of the final states for the respective group of N state machines implemented on the first level parallel machine.

In Example 49, the subject matter of any of Examples 1-48 can optionally include wherein the first level parallel machine comprises a finite state machine engine.

In Example 50, the subject matter of any of Examples 1-49 can optionally include wherein the finite state machine engine comprises an array of groups of programmable elements, and wherein each of the groups of programmable elements is coupled to a respective one of the N-digit outputs.

In Example 51, the subject matter of any of Examples 1-50 can optionally include wherein the first level parallel machine has a plurality of N-digit input and wherein each of the groups of programmable elements is coupled to a respective one of the N-digit inputs of the first level parallel machine.

In Example 52, the subject matter of any of Examples 1-51 can optionally include wherein the second level parallel machine comprises a finite state machine engine.

In Example 53, the subject matter of any of Examples 1-52 can optionally include wherein the finite state machine engine comprises an array of groups of programmable elements, and wherein each of the groups of programmable elements is coupled to a respective one of the N-digit inputs.

In Example 54, the subject matter of any of Examples 1-53 can optionally include wherein the second level parallel machine has a plurality of N-digit outputs and wherein each of the groups of programmable elements is coupled to a respective one of the N-digit output of the second level parallel machine.

In Example 55, the subject matter of any of Examples 1-54 can optionally include wherein the first parallel machine comprises a first die, and the second parallel machine comprises a second die stacked with the first die.

In Example 56, subject matter of any of Examples 1-55 can optionally include further comprising a third parallel machine and a bus, wherein the third parallel machine comprises a third dies stacked with the first die and the second die, wherein the second die is between the first die and the third die in the stack, and wherein the bus is configured to transfer state information between the first parallel machine and the third parallel machine.

In Example 57, the subject matter of any of Examples 1-56 can optionally include wherein the bus comprises a plurality of interconnects.

In Example 58, the subject matter of any of Examples 1-57 can optionally include wherein the interconnects comprise through via interconnects.

In Example 59, the subject matter of any of Examples 1-58 can optionally include wherein the parallel machines comprise finite state machine engines.

In Example 60, the subject matter of any of Examples 1-59 can optionally include wherein the finite state machine engines comprise pattern recognition processors.

In Example 61, the subject matter of any of Examples 1-60 can optionally include wherein the parallel machines comprise field programmable gate arrays.

In Example 62, the subject matter of any of Examples 1-61 can optionally include wherein the at least one N-digit input of the first level parallel machine is configured to receive raw data.

In Example 63, the subject matter of any of Examples 1-62 can optionally include wherein each of the N-digit inputs of the second level parallel machine correspond to a respective group of N state machines implemented on the second level parallel machine, wherein each group of N state machines implemented on the second level parallel machine is driven by up to N state machines implemented on the first level parallel machine.

In Example 64, the subject matter of any of Examples 1-63 can optionally include wherein the other device comprises a second parallel machine, wherein the second parallel machine is configured to receive and process the compressed state information.

In Example 65, the subject matter of any of Examples 1-64 can optionally include wherein the parallel machine being configured to compress the state information comprises the parallel machine being configured to aggregate final states of a finite state machine implemented on the parallel machine.

In Example 66, the subject matter of any of Examples 1-65 can optionally include Boolean logic configured to aggregate the final states.

In Example 67, the subject matter of any of Examples 1-66 can optionally include wherein the parallel machine being configured to compress the state information comprises the parallel machine being configured to output a difference vector, wherein the difference vector identifies only those states that have changed in response to an input symbol.

In Example 68, the subject matter of any of Examples 1-67 can optionally include wherein the parallel machine being configured to compress the state information comprises the parallel machine being configured to output an output vector, wherein the output vector only provides state information for final states in a finite state machine implemented on the parallel machine.

The invention claimed is:

1. A method, comprising:
   determining state information of a plurality of programmable elements of a parallel machine, wherein each programmable element of the plurality of programmable elements is configured to have a corresponding state;
   compressing the state information by aggregating final states of a plurality of finite state machines implemented on the parallel machine to generate aggregated results as the compressed state information; and
   providing the compressed state information to a second device.

2. The method of claim 1, wherein compressing the state information includes applying a lossless compression algorithm to the state information.

3. The method of claim 1, wherein providing the compressed state information to the second device comprises providing the compressed state information to system memory as the second device.

4. The method of claim 1, wherein providing the compressed state information to the second device comprises providing the compressed state information to a second parallel machine as the second device.

5. The method of claim 4, comprising grouping the aggregated results to generate the compressed state information.

6. The method of claim 5, wherein a first number of groups utilized in the grouping corresponds to a second number of digits in an input symbol of a symbol language of the parallel machine.

7. A device, comprising:
   a plurality of programmable elements, wherein each programmable element of the plurality of programmable elements is configured to have a corresponding state; and
   an output configured to provide compressed state information to a second device, wherein the compressed state information comprises state information of the plurality of programmable elements as a difference vector, wherein the difference vector identifies only those states that have changed in response to an input symbol.

8. The device of claim 7, wherein the device comprises a parallel machine and the second device comprises a second parallel machine.

9. The device of claim 8, wherein the second parallel machine is configured to receive and process the compressed state information.

10. The device of claim 7, wherein the device comprises the second parallel machine.

11. The device of claim 7, wherein compressed state information comprises a location of a digit in the state information that changed in a previous symbol cycle.

12. The device of claim 11, wherein the output is configured to provide the compressed state information in conjunction with a bus cycle of the device.

13. A device, comprising:
   a plurality of programmable elements, wherein each programmable element of the plurality of programmable elements is configured to have a corresponding state;
   a logic circuit configured to aggregate final states of a plurality of finite state machines implemented on a parallel machine to generate aggregated results as compressed state information; and
   an output configured to provide the compressed state information to a second device.

14. The device of claim 13, wherein the output is configured to provide the compressed state information to system memory as the second device.

15. The device of claim 13, wherein the output is configured to provide the compressed state information to a second parallel machine as the second device.

16. The device of claim 15, wherein the device is configured to group the aggregated results to generate the compressed state information.

17. The device of claim 16, wherein the device is configured to group the aggregated results based upon a value of a number of digits in an input symbol of a symbol language of the parallel machine.

18. The device of claim 15, wherein the second parallel machine is configured to provide the compressed state information to second a plurality of programmable elements of the second parallel machine.

19. The device of claim 15, wherein the second parallel machine is configured to provide the compressed state information sequentially to groups of second programmable elements of the second parallel machine.

20. The device of claim 15, wherein the second parallel machine is configured to receive address information related to the compressed state information.

* * * * *